US008223596B2

(12) United States Patent
Chou et al.

(10) Patent No.: US 8,223,596 B2
(45) Date of Patent: Jul. 17, 2012

(54) THERMALLY-ASSISTED MAGNETIC RECORDING HEAD WITH PLANE-EMISSION TYPE LIGHT SOURCE

(75) Inventors: Tsutomu Chou, Tokyo (JP); Eiji Komura, Tokyo (JP); Koji Shimazawa, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 309 days.

(21) Appl. No.: 12/581,385

(22) Filed: Oct. 19, 2009

(65) Prior Publication Data
US 2011/0090587 A1    Apr. 21, 2011

(51) Int. Cl.
*G11B 11/00* (2006.01)
(52) U.S. Cl. .................................. 369/13.33; 369/13.13
(58) Field of Classification Search ............... 369/13.33, 369/13.13, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 5,946,281 A | 8/1999 | Ito et al. | |
| 6,711,200 B1 | 3/2004 | Scherer et al. | |
| 7,330,404 B2 | 2/2008 | Peng et al. | |
| 7,454,095 B2 | 11/2008 | Baehr-Jones et al. | |
| 7,729,085 B2 * | 6/2010 | Jin et al. | 369/13.33 |
| 2008/0002298 A1 | 1/2008 | Sluzewski | |
| 2010/0195238 A1 * | 8/2010 | Shimazawa et al. | 369/13.33 |
| 2010/0195239 A1 * | 8/2010 | Takayama et al. | 369/13.33 |
| 2010/0202081 A1 * | 8/2010 | Shimazawa et al. | 369/13.33 |
| 2011/0026377 A1 * | 2/2011 | Shimazawa et al. | 369/13.24 |
| 2011/0122737 A1 * | 5/2011 | Shimazawa et al. | 369/13.24 |
| 2011/0122754 A1 * | 5/2011 | Kuiseko et al. | 369/13.33 |
| 2011/0128829 A1 * | 6/2011 | Nishida et al. | 369/13.32 |
| 2011/0188354 A1 * | 8/2011 | Sasaki et al. | 369/13.32 |

FOREIGN PATENT DOCUMENTS

| | | |
|---|---|---|
| JP | 6-326412 | 11/1994 |
| JP | 2005-4901 | 1/2005 |

OTHER PUBLICATIONS

Kyosuke Sakai, et al., "Lasing Band-Edge Identification for a Surface-Emitting Photonic Crystal Laser", IEEE Journal on Selected Areas in Communications, vol. 23, No. 7, Jul. 2005, pp. 1335-1340.
Michael Hochberg, et al., "Integrated Plasmon and dielectric waveguides", Optics Express, vol. 12, No. 22, Nov. 2004, pp. 5481-5486.

* cited by examiner

*Primary Examiner* — Tan X Dinh
(74) *Attorney, Agent, or Firm* — Frommer Lawrence & Haug LLP

(57) ABSTRACT

A thermally-assisted magnetic recording head includes a surface-emitting type light source for emitting substantially collimated beam, a first diffraction optical element for focusing the substantially collimated beam emitted from the surface-emitting type light source, a second diffraction optical element for collimating the light beam focused by the first diffraction optical element, a waveguide integrally formed with the second diffraction optical element and made of the material as that of second diffraction optical element, the light beam collimated by the second diffraction optical element being incident to the waveguide, an optical-path direction conversion element for converting a direction of an optical path of the incident light beam to a propagation direction of the waveguide, the propagation direction being toward an opposed-to-medium surface, and a magnetic pole for generating write field from its end face on the opposed-to-medium surface side.

13 Claims, 9 Drawing Sheets

THERMALLY-ASSISTED MAGNETIC RECORDING HEAD WITH PLANE-EMISSION TYPE LIGHT SOURCE

BACKGROUND OF THE INVENTION

1. Field of the Invention

The present invention relates to a magnetic recording head used for thermally-assisted magnetic recording in which a magnetic recording medium is irradiated with beam from a plane-emission or surface-emitting type light source, thereby anisotropic magnetic field of the medium is lowered, thus data can be written. Further, the present invention relates to a head gimbal assembly (HGA) provided with the head, and to a magnetic recording apparatus provided with the HGA.

2. Description of the Related Art

As the recording density of a magnetic recording apparatus, as represented by a magnetic disk apparatus, becomes higher, further improvement has been required in the performance of a thin-film magnetic head and a magnetic recording medium. Particularly, in the magnetic recording medium, it is necessary to decrease the size of magnetic micro particles that constitute the magnetic recording layer of the medium, and to reduce irregularity in the boundary of record bit in order to improve the recording density. However, the decrease in size of the magnetic micro particles raises a problem of degradation in thermal stability of the magnetization due to the decrease in volume. As a measure against the thermal stability problem, it may be possible to increase the magnetic anisotropy energy Ku of the magnetic micro particles. However, the increase in energy Ku causes the increase in anisotropic magnetic field (coercive force) of the magnetic recording medium. As a result, the head cannot write data to the magnetic recording medium when the anisotropic magnetic field of the medium exceeds the upper write field limit.

Recently, as a method for solving the problem of thermal stability, so-called a thermally-assisted magnetic recording technique was proposed. In the technique, a magnetic recording medium formed of a magnetic material with a large energy Ku is used so as to stabilize the magnetization, then anisotropic magnetic field of a portion of the medium, where data is to be written, is reduced by heating the portion, just after that, writing is performed by applying write magnetic field to the heated portion.

In this thermally-assisted magnetic recording technique, there has been generally used a method in which a magnetic recording medium is irradiated and thus heated with a light such as near-field light. In this case, it is important to form a very minute beam spot at a desired position on the magnetic recording medium. However, from the beginning, more significant problem to be solved exists in how the beam is to be supplied from a light source to the inside of a head, and specifically, where and how the light source is to be arranged.

As for the supplying of beam, for example, US Patent Publication No. 2008/0002298A1 and Japanese patent publication No. 2005-4901A disclose heads each having a light source arranged on or above an integration surface of a slider substrate. In the head, a surface-emitting laser diode that can be easily mounted on the integration surface is used as the light source and a laser beam from the surface-emitting laser diode is guided to a desired position using a diffraction grating or a hologram lens and a beam-scattering element. Also, U.S. Pat. No. 5,946,281A and Japanese patent publication No. 6-326412A disclose light heads, although not thermally-assisted magnetic recording heads, each of which has a diffraction grating lens for focusing the laser beam from the surface-emitting laser diode.

However, the surface-emitting laser diode used in these documents is a vertical-cavity surface-emitting laser (VCSEL) that is widely used. In a magnetic recording head using such the VCSEL, an insufficient laser output power is likely to lead to serious problems. In a magnetic disk apparatus for performing the thermally-assisted magnetic recording with use of near-field light, the amount of output of near-field light, required for attaining a recording density exceeding 1 Tbits/$in^2$ has been approximately 1 mW with a spot diameter of 40 nm or less, according to the estimation by the present inventors using simulation and the like. Moreover, the beam use efficiency, which the present inventors estimated for the overall optical system in an expected head structure, has been approximately 2%. Therefore, the output power necessary for the laser diode as a light source is estimated to be 50 mW or more. However, a VCSEL generally has a short cavity length, and the output power is about several mW for general use. Therefore, it is difficult for the use of the VCSEL to meet such a high output power.

As aforementioned, according to the conventional technique, it was impossible to use a surface-emitting laser diode having a sufficient output light power and also it was impossible to realize leading of a beam spot with a micro diameter from the surface-emitting laser diode to a desired position.

SUMMARY OF THE INVENTION

It is therefore an object to provide a thermally-assisted magnetic recording head with a surface-emitting light source, an HGA provided with the head, and a magnetic recording apparatus provided with the HGA, whereby a sufficient light power can be led with a micro light spot to a desired position.

Some terms used in the specification will be defined before explaining the present invention. In a layered structure or an element structure formed in the element-formed surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end face other than the end faces perpendicular to the direction in which light propagates within the waveguide (−X direction), out of all the end faces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head includes a surface-emitting type light source for emitting substantially collimated beam, a first diffraction optical element for focusing the substantially collimated beam emitted from the surface-emitting type light source, a second diffraction optical element for collimating the light beam focused by the first diffraction optical element, a waveguide integrally formed with the second diffraction optical element and made of the material as that of second diffraction optical element, the light beam collimated by the second diffraction optical element being incident to the waveguide, an optical-path direction conversion element for converting a direction of an optical path of the incident light beam to a propagation direction of the waveguide, the propagation direction being toward an opposed-to-medium surface, and a magnetic pole for generating write field from its end face on the opposed-to-medium surface side.

The parallel beam from the surface-emitting type light source configured by a surface-emitting laser diode is focused by the first diffraction optical element, and the focused beam is collimated by the second diffraction optical element. The collimated beam is incident on the waveguide that is integrally formed with the second diffraction optical element and made of the same material as that of the second diffraction optical element. The optical path of the incident beam of the waveguide is converted by the optical-path direction conversion element and the path-converted beam is transmitted to opposed-to-medium surface. The surface-emitting type light source emits a large spot-sized substantially parallel beam with a spot diameter of 50 µm or more, but it is necessary to decrease the spot diameter so as to effectively apply the beam into the waveguide with a very small diameter of around 0.5 µm. According to the present invention, because the second diffraction optical element for collimation is provided so that the focused beam focused by the first diffraction optical element is collimated by the second diffraction optical element and the collimated beam is incident on the waveguide, occurrence of multi-mode light due to aberration of the focused beam can be prevented and thus the light beam from the surface-emitting type light source can be extremely efficiently guided to the waveguide. Furthermore, since the second diffraction optical element and the waveguide are integrally formed with each other and made of the same material, an efficiency of beam utilization is extremely improved. As a result, the large powered laser beam from the surface-emitting type light source can be extremely efficiently led to a desired position as a very micro spot beam.

It is preferred that the surface-emitting type light source and the first diffraction optical element are faced to each other through an air space. In this case, preferably, an antireflective film is coated on an incident surface of the first diffraction optical element. This antireflective film preferably includes a film for reducing an intensity of a reflected light beam using optical interference. Because the antireflective film is provided, it is possible to increase largely transmission factor of the first diffraction optical element.

It is also preferred that the optical-path direction conversion element includes a reflection mirror formed at an end surface of the waveguide, for reflecting the incident light beam in an axis direction of the waveguide.

It is further preferred that at least one of the first diffraction optical element and the second diffraction optical element comprises a Fresnel lens or a binary Fresnel lens. By using Fresnel lens or binary Fresnel lens, it is possible to fabricate these diffraction elements thin resulting the efficiency of the head manufacturing process to improve.

It is still further preferred that the surface-emitting type light source includes a laser source formed on an element-formed surface of a substrate, and provided with a multi-layered structure including a photonic-band layer having a periodic structure in which a light generated from an active region resonates, and the laser source having a light-emitting surface that is a layer surface as an end face of the multi-layered structure and is opposed to the element-formed surface.

The surface-emitting type light source according to the present invention has a multi-layered structure including a photonic-band layer, and thus is a laser diode of surface-emitting type that emits laser light on a quite different principle from that of a vertical-cavity surface-emitting laser (VCSEL). Therefore, the light source can be disposed in the element-formed surface of the substrate to achieve improvement of mass-productivity, even though the light source has a sufficiently high output power for performing thermal assist. As a result, according to the present invention, there is provided a thermally-assisted magnetic recording head in which a light source having a sufficiently high output power is disposed in the element-formed surface of the substrate to achieve improvement of mass-productivity.

In this case, preferably, the photonic-band layer has a two-dimensional periodic surface with the periodic structure and a lens surface perpendicular to an optical axis of the first diffraction optical element, the two-dimensional periodic surface and the lens surface being parallel to the element-formed surface of the substrate.

It is further preferred that the head further includes a plasmon antenna for exciting a surface plasmon in response to the light beam propagated through the waveguide to generate a near-field light from an end face at a side of the opposed-to-medium surface, and that the plasmon antenna is opposed to an edge of the waveguide at the side of the opposed-to-medium surface with a predetermined space. In this case, preferably, the plasmon antenna has an edge extending from a portion that is coupled with the light propagating through the waveguide in a surface plasmon mode to a near-field light generating end face that generates the near-field light, the edge propagating the surface plasmon excited by the light beam.

It is still further preferred that the surface-emitting type light source includes a photonic-crystal type surface-emitting laser diode with an output power of at least 50 mW.

According to the present invention, also, an HGA includes a thermally-assisted magnetic recording head and a suspension for supporting the thermally-assisted magnetic recording head. This thermally-assisted magnetic recording head includes a surface-emitting type light source for emitting substantially collimated beam, a first diffraction optical element for focusing the substantially collimated beam emitted from the surface-emitting type light source, a second diffraction optical element for collimating the light beam focused by the first diffraction optical element, a waveguide integrally formed with the second diffraction optical element and made of the material as that of second diffraction optical element, the light beam collimated by the second diffraction optical element being incident to the waveguide, an optical-path direction conversion element for converting a direction of an optical path of the incident light beam to a propagation direction of the waveguide, the propagation direction being toward an opposed-to-medium surface, and a magnetic pole for generating write field from its end face on the opposed-to-medium surface side.

According to the present invention, further, a magnetic recording apparatus includes at least one HGA with a thermally-assisted magnetic recording head and a suspension for supporting the thermally-assisted magnetic recording head, at least one magnetic recording medium, and a recording control circuit for controlling write operations of the thermally-assisted magnetic recording head to the at least one magnetic recording medium. The thermally-assisted magnetic recording head includes a surface-emitting type light source for emitting substantially collimated beam, a first diffraction optical element for focusing the substantially collimated beam emitted from the surface-emitting type light source, a second diffraction optical element for collimating the light beam focused by the first diffraction optical element, a waveguide integrally formed with the second diffraction optical element and made of the material as that of second diffraction optical element, the light beam collimated by the second diffraction optical element being incident to the waveguide, an optical-path direction conversion element for converting a direction of an optical path of the incident light beam to a propagation direction of the waveguide, the propagation direction being toward an opposed-to-medium surface, and a magnetic pole for generating write field from its end face on the opposed-to-medium surface side.

Further objects and advantages of the present invention will be apparent from the following description of the preferred embodiments of the invention as illustrated in the accompanying drawings.

DESCRIPTION OF THE PREFERRED EMBODIMENTS

Figure 1:
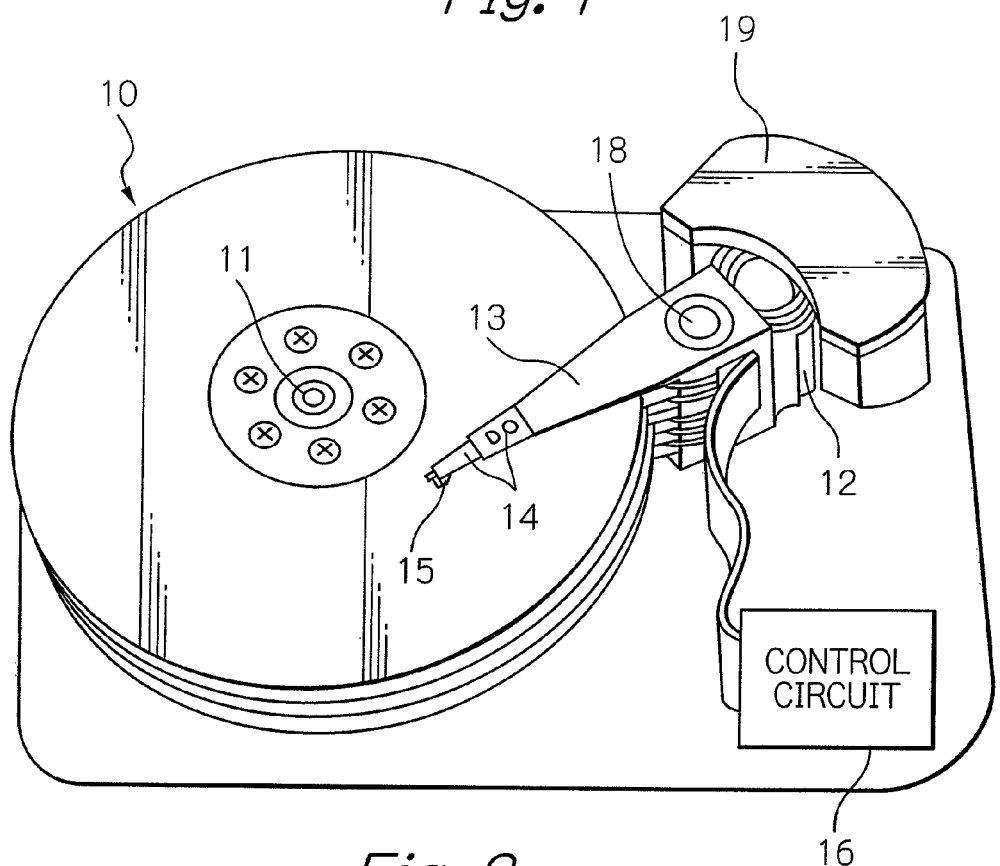
FIG. 1 is a perspective view schematically illustrating the structure of a main part in an embodiment of a magnetic recording apparatus according to the present invention.

Hereinafter, the embodiment according to the present invention will be described in detail with reference to these drawings. In the drawings, the same components are indicated using the same reference numerals, respectively. Dimension ratios of components in the drawings are modified to easily understand the embodiment.

Figure 2:
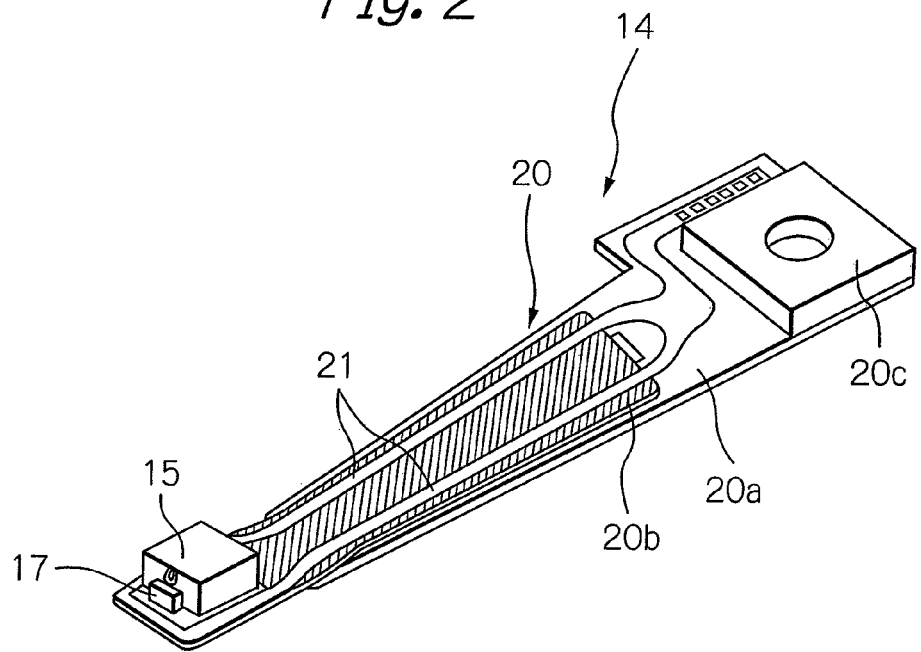
FIG. 2 is a perspective view schematically illustrating the structure of an HGA in the embodiment of FIG. 1.

FIG. 1 schematically illustrates the structure of a major part in an embodiment of a magnetic recording apparatus and an HGA according to the present invention, and FIG. 2 schematically illustrates the structure of the HGA in the embodiment of FIG. 1. In FIG. 2, a face of the HGA opposed to the surface of the magnetic recording medium is indicated as the upper side.

As shown in these drawings, a magnetic disk drive apparatus as an example of the magnetic recording apparatus includes a plurality of magnetic disks 10 that correspond to magnetic recording media, rotating around a rotational axis of a spindle motor 11, an assembly carriage device 12 provided with a plurality of drive arms 13, an HGA 14 attached on the top end section of each drive arm 13 and provided with a thermally-assisted magnetic recording head or a thin-film magnetic head 15, and a recording/reproducing and light-emission control circuit 16 for controlling read/write operations of the thermally-assisted magnetic recording head 15 and further for controlling the light-emission operation of a laser diode 17 assembled in the thermally-assisted magnetic recording head 15.

The laser diode 17 is a light source for emitting laser beam used for thermally-assisting the magnetic recording, and is mounted on an element-integration surface of a slider substrate of the thermally-assisted magnetic recording head 15. The laser diode 17 has a photonic-band layer for resonating a light generated from an active layer, and is configured by, in this embodiment, a photonic-crystal type surface-emitting laser diode.

The magnetic disk 10 is, in this embodiment, designed for perpendicular magnetic recording, and has a structure with a soft-magnetic back layer, an intermediate layer and a magnetic recording layer or perpendicular magnetization layer sequentially stacked on a disk substrate. The anisotropic magnetic field or coercive force of the magnetic recording layer is set to be a sufficiently large value for stabilizing the magnetization in room temperature.

The assembly carriage device 12 is a device for positioning the thermally-assisted magnetic recording head 15 above a track formed on the magnetic recording layer of the magnetic disk 10. Along each track, a plurality of recording bits are aligned.

The plurality of drive arms 13 are stacked in a direction along a pivot bearing axis 18 and can be angularly swung around the axis 18 by a voice coil motor (VCM) 19. The structure of the magnetic disk apparatus according to the present invention is not limited to that described above. For instance, in a modification, only a single magnetic disk 10, a drive arm 13, an HGA 14 and a thermally-assisted magnetic recording head 15 may be provided.

As shown in FIG. 2, the HGA 14 has a suspension 20 with a load beam 20a, an elastic flexure 20b fixed to the load beam 20a and a base plate 20c attached to a base portion of the load beam 20a. The HGA 14 further has the thermally-assisted magnetic recording head 15 mounted on the flexure 20b, a laser diode 17 formed on the element-integration surface of the thermally-assisted magnetic recording head 15, and a wiring member 21 formed on the flexure 20b and made up of lead conductors and connection pads electrically joined to both ends of the lead conductors.

The thermally-assisted magnetic recording head 15 is fixed to the flexure 20b, that is, to a top end section of the suspension 20 so as to face the surface of each magnetic disk 10 with a predetermined spacing (flying height). Moreover, one ends of the wiring member 21 are electrically connected to terminal electrodes of the thermally-assisted magnetic recording head 15. The structure of the suspension 20 is not limited to the above-described one. An IC chip for driving the head may be mounted midway on the suspension 20, though not shown.

Figure 3:
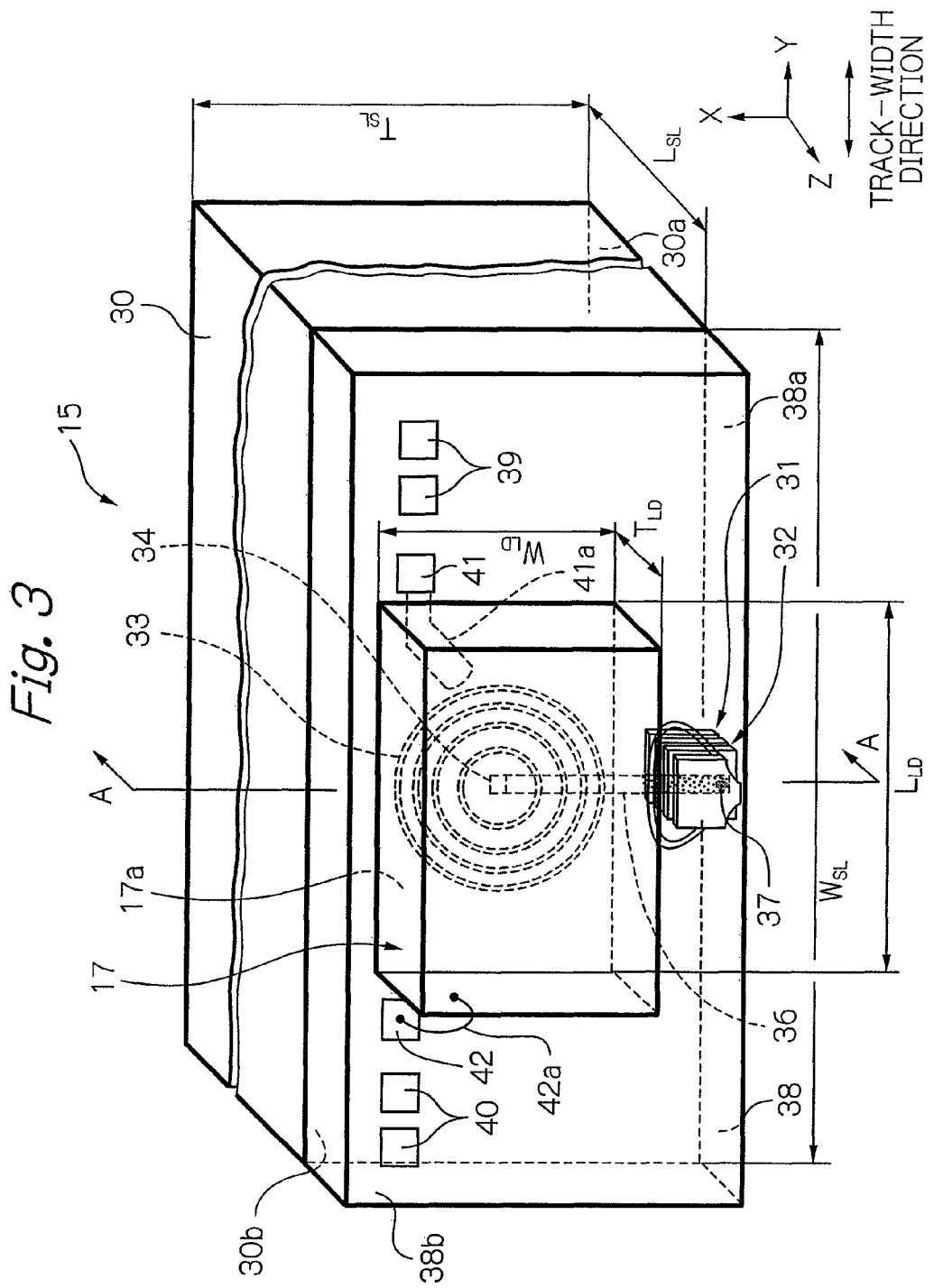
FIG. 3 is a perspective view schematically illustrating the structure of a thermally-assisted magnetic recording head in the embodiment of FIG. 1.
Figure 4:
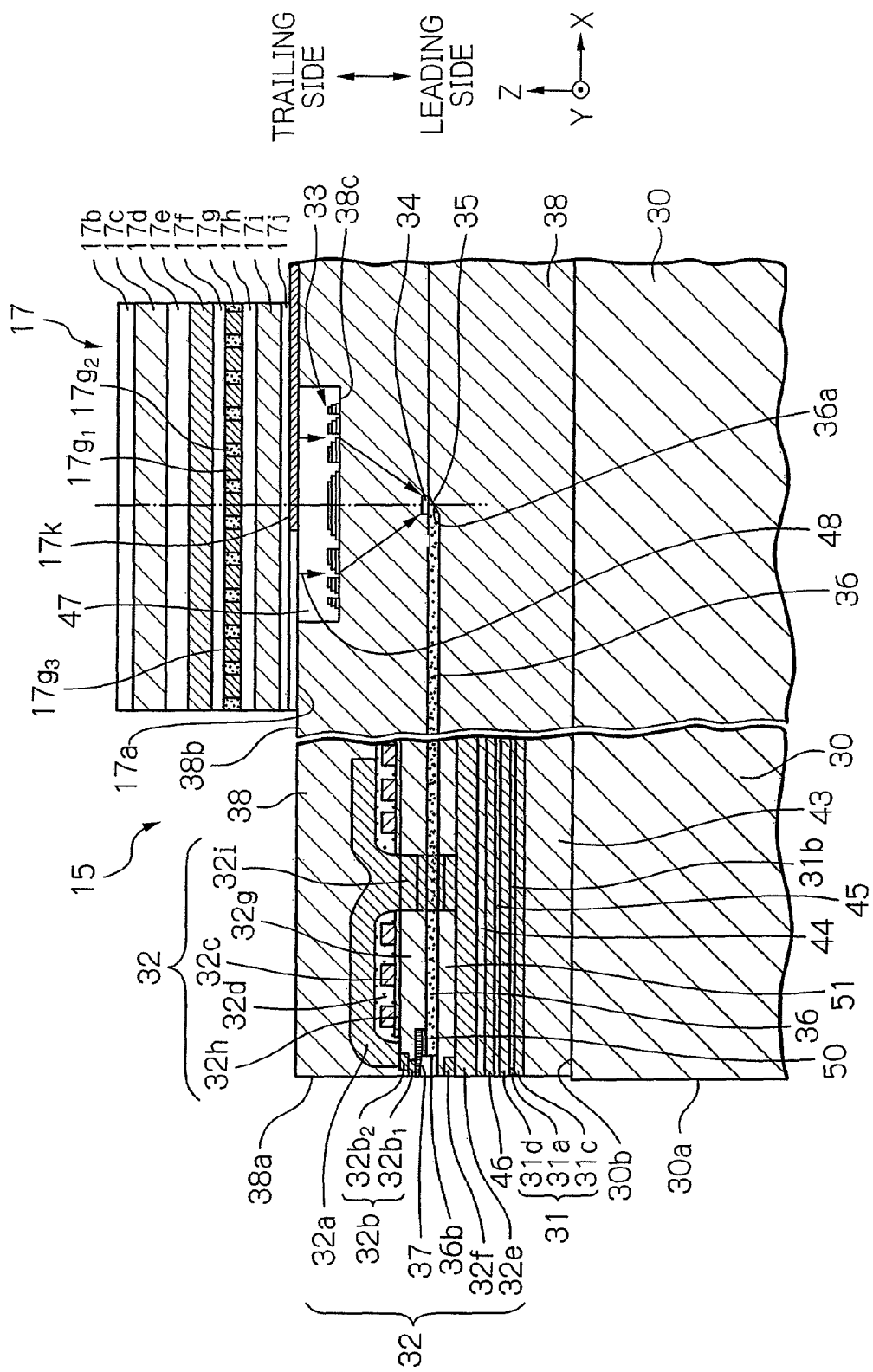
FIG. 4 is a sectional view of an A-A section in FIG. 3, schematically illustrating the configuration of a head element, a near-field light generating optical system, and their vicinity in the thermally-assisted magnetic recording head shown in FIG. 3.

FIG. 3 schematically illustrates the structure of the thermally-assisted magnetic recording head in the embodiment of FIG. 1, and FIG. 4, showing an A-A section in FIG. 3, schematically illustrates the configuration of a head element, a near-field light generating optical system, and their vicinity in the thermally-assisted magnetic recording head shown in FIG. 3.

As shown in these figures, the thermally-assisted magnetic recording head 15 includes a slider substrate 30 formed of, for example, AlTiC ($Al_2O_3$—TiC), and having an air bearing surface (ABS) 30a as an opposed-to-disk surface processed so as to provide an appropriate flying height. On the element-formed surface 30b of the slider substrate 30, which is perpendicular to the ABS 30a, an magnetoresistive effect (MR) read head element 31 for reading out data from the magnetic disk, an inductive magnetic write head element 32 for writing data onto the magnetic disk, a first diffraction lens 33 for focusing, which corresponds to the first diffraction optical element according to the present invention, a second diffraction lens 34 for collimating, which corresponds to the second diffraction optical element according to the present invention, a reflection mirror 35, which corresponds to the optical path conversion element according to the present invention, a waveguide 36, a surface plasmon antenna 37, and a protection layer 38 for covering these components.

The laser diode 17 is mounted on a surface 38b of the protection layer 38. A head end face 38a, which is the opposed-to-disk surface of the protection layer 38, and the ABS 30a constitute an opposed-to-disk surface of the whole of the thermally-assisted magnetic recording head 15.

The laser diode 17 has a multi-layered structure with an active layer for generating a light and a photonic-band layer having a periodic structure in which the generated light resonates. The bottom surface 17a that is one end face of this multi-layered structure configures a light-emitting surface for emitting a laser beam. This light-emitting surface 17a opposes to the element-formed surface 30b and is in this embodiment adhered to a surface 38b of the protection layer 38. Configuration of the laser diode 17 will be described in detail with reference to FIG. 5 later.

The first diffraction lens 33, the second diffraction lens 34, the reflection mirror 35 and the waveguide 36 configure an optical system for effectively guiding a laser beam emitted form the light-emitting surface 17a of the laser diode 17 to the surface plasmon antenna 37. Configuration of this optical system will be also described in detail with reference to FIG. 6 later.

The thermally-assisted magnetic recording head 15 in this embodiment has a pair of terminal electrodes 39 exposed from the surface 38b of the protection layer 38 and electrically connected to the MR read head element 31, a pair of terminal electrodes 40 also exposed from the surface 38b of the protection layer 38 and electrically connected to the inductive write head element 32, and a pair of terminal electrodes 41 and 42 also exposed from the surface 38b of the protection layer 38 and electrically connected to the respective electrodes of the laser diode 17. These terminal electrodes 39, 40, 41 and 42 are capable of electrically connecting with connection pads of the wiring member 21 formed on the flexure 20b (FIG. 1).

One ends of the MR read head element 31, the inductive write head element 32 and the surface plasmon antenna 37 reach the head end face 38a of the protection layer 38 as an opposed-to-medium surface. During actual write and read operations, the thermally-assisted magnetic recording head 15 aerodynamically flies above the surface of the rotating magnetic disk 10 (FIG. 1) with a predetermined flying height. Thus, the ends of the MR read head element 31 and the inductive write head element 32 face the surface of the magnetic recording layer of the magnetic disk 10 with an appropriate magnetic spacing. Then, the MR read head element 31 performs read operation by sensing data signal magnetic field from the magnetic recording layer, and the inductive write head element 32 performs write operation by applying data signal magnetic field to the magnetic recording layer. When writing data, laser beam is emitted from the light-emitting surface 17a of the laser diode 17 disposed in the element-formed surface 30b of the slider substrate 30, and propagates through the first diffraction lens 33, the second diffraction lens 34, the reflection mirror 35 and the waveguide 36. Thereafter the laser beam or waveguide beam is coupled with the surface plasmon antenna 37 in a surface plasmon mode, as described in detail later. As a result, surface plasmon is excited on the surface plasmon antenna 37. The excited surface plasmon propagates on a propagation edge 37a (FIG. 6) provided in the surface plasmon antenna 37, which will be detailed later, toward the head end face 38a, which causes near-field light to be generated from the end at the side of the head end face 38a of the surface plasmon antenna 37. The generated near-field light reaches the surface of the magnetic disk, and heats a portion of the magnetic recording layer of the disk. As a result, the anisotropic magnetic field or coercive force of that portion is decreased to a value capable of writing, so that a thermally-assisted magnetic recording can be accomplished.

As shown in FIG. 3, it is desired that the slider substrate 30 is so-called a femto slider in which a thickness $T_{SL}$ (in X-axis direction) is 230 μm, a width $W_{SL}$ in the track-width direction (Y-axis direction) is 700 μm, and a length $L_{SL}$ (in Z-axis direction) is 850 μm. The femto slider is generally used as a substrate for thin-film magnetic heads capable of high-density recording, and has the smallest standardized size of all the sliders currently on the market. In this case, the element-formed surface 30b of the slider substrate 30 is a region with an area of 230 μm ($T_{SL}$)×700 μm ($W_{SL}$).

The laser diode 17 is mounted on such the element-formed surface 30b as a light source for generating laser beam used for the thermally-assisted magnetic recording described above. This laser diode 17 is, in this embodiment, a photonic-crystal type surface-emitting laser diode with a power of 50 mW or more, and has a multi-layered structure including an active layer for generating a light and a photonic-band layer having a periodic structure in which the generated light resonates. Here, the light-emitting surface 17a that emits laser beam of the laser diode 17 is the bottom surface of the multi-layered structure, and faces the element-formed surface 30b of the slider substrate 30. In this embodiment, the laser diode 17 is adhered to the surface 38b of the protection layer 38. The height $T_{LD}$ of the laser diode 17 is, for example, in the range of approximately 50 to 200 μm. Each of the width $W_{LD}$ and the length $L_{LD}$ of the laser diode 17 is, for example, in the range of approximately 50 to 200 μm. These sizes of the laser diode 17 indicated that this laser diode 17 could be mounted well within the element-formed surface 30b of the slider substrate 30. By mounting the laser diode 17 on the element-formed surface 30b of the slider substrate 30, the construction of the optical system is completed in the stage of the wafer process, which makes this construction comparatively facilitated and simplified and allows improvement of mass-productivity.

The laser diode 17 is preferably a photonic-crystal type surface-emitting laser diode with an output of at least 50 mW. This laser diode enables a sufficient and rapid heating of a portion of the magnetic recording layer. In the photonic-crystal type surface-emitting laser diode, a laser beam of a single-mode having an extremely small divergence angle (for example, 1° or less) can be emitted from the light-emitting surface 17a. Further, the polarization of the emitted laser beam can be set considerably freely, for example, a linear polarization can be realized, which is desirable for the excitation of surface plasmon explained later. Here, a single-mode means a state in which the beam spot has a circular or elliptical shape and the light intensity distribution is represented by the Gaussian distribution with single-peaked pattern. Whereas, a state in which the beam spot has a doughnut-shape or has a light intensity distribution with multi-peaked pattern is referred to as a multi-mode. The structure and characteristic of the laser diode 17 will be explained in detail later with reference to FIG. 5.

Also as shown in FIG. 3, the terminal electrode 41 is electrically connected, through a lead electrode 41a, with a p-electrode 17k (FIG. 5) formed on the light-emitting surface 17a that is a lower surface (bottom surface) of the laser diode 17. The terminal electrode 42 is electrically connected with an n-electrode 17b (FIG. 5) that corresponds to an upper surface of the laser diode 17. The terminal electrode 42 and the n-electrode 17b may be connected to each other by wire-bonding as shown in FIG. 3, or by solder-ball bonding (SBB) with a solder. By electrically connecting the terminal electrodes 41 and 42 to connection pads of the wiring member 21 provided on the flexure 20b (FIG. 1), a predetermined voltage could be applied to the laser diode 17 through both electrodes 41 and 42. This voltage application causes laser beam to be emitted from the light-emitting surface 17a of the laser diode 17.

Further, an electric source provided within the magnetic disk apparatus can be used for driving the laser diode 17. In fact, the magnetic disk apparatus usually has an electric source with an applying voltage of, for example, approximately 2 to 5 V, which is sufficient for the laser oscillation. The laser diode 17 preferably has an output power of at least 50 mW as described above, even in the case that the amount of electric power consumption of the laser diode 17 is, for example, in the neighborhood of one hundred mW, the amount can be covered sufficiently by the electric source provided within the magnetic disk apparatus. Further, the laser diode 17 and terminal electrodes 41 and 42 are not limited to the above-described embodiment. For example, other configurations of the laser diode 17 and the terminal electrodes 41 and 42 may be possible. Further, at least one electrode of the laser diode 17 can electrically be connected directly with the connection pads of the wiring member 21.

Hereinafter, with reference to FIG. 4, configurations of the near-field light generating optical system and their vicinity in the thermally-assisted magnetic recording head 15 will be described in detail.

As shown in FIG. 4, the MR read head element 31 is formed on an insulation layer 43 stacked on the element-formed surface 30b, and includes an MR multilayer 31a, and a lower shield layer 31c and an upper shield layer 31d which sandwich the MR multilayer 31a and an insulation layer 31b therebetween. The upper and lower shield layers 31d and 31c prevent the MR multilayer 31a from receiving external magnetic field as a noise. The MR multilayer 31a is a magneto-sensitive part for detecting signal magnetic field by using MR effect. The MR multilayer 31a may be, for example, a current-in-plane giant magnetoresistive effect (CIP-GMR) multilayer, a current-perpendicular-to-plane giant magnetoresistive effect (CPP-GMR) multilayer, or a tunnel magnetoresistive effect (TMR) multilayer. The MR multilayer 31a that may be any of CIP-GMR, CPP-GMR and TMR described above can detect signal magnetic field from the magnetic disk with high sensitivity. In the case that the MR multilayer 31a is a CPP-GMR multilayer or a TMR multilayer, the upper and lower shield layers 31d and 31c act as electrodes.

Referring also to FIG. 4, the inductive write head element 32 is designed for perpendicular magnetic recording, and includes an upper yoke layer 32a, a main magnetic pole 32b, a write coil layer 32c, a coil-insulation layer 32d, a lower yoke layer 32e and a lower shield 32f.

The upper yoke layer 32a is formed so as to cover the coil-insulation layer 32d, and the main magnetic pole 32b is formed on an insulation layer 32g made of an insulation material such as $Al_2O_3$ (alumina). These upper yoke layer 32a and main magnetic pole 32b are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 32c. The main magnetic pole 32b includes a first main pole portion $32b_1$ reaching the head end face 38a and having a small width in the track width direction; and a second main pole portion $32b_2$ located on the first main pole portion $32b_1$ and at the rear (+X side) of the portion $32b_1$. The small width of the first main pole portion $32b_1$ enables the generation of a fine write magnetic field responding to higher recording density. The main magnetic pole 32b is formed of a soft-magnetic material with a saturation magnetic flux density higher than that of the upper yoke layer 32a, which is, for example, an iron alloy containing iron (Fe) as a main component, such as permalloy (NiFe), cobalt iron (CoFe), cobalt iron nickel (CoFeNi), iron nitride (FeN) or iron zirconium nitride (FeZrN). The thickness of the first main pole portion $32b_1$ is, for example, in the range of approximately 0.1 to 0.8 µm.

The write coil layer 32c is formed on an insulation layer 32h made of an insulation material such as $Al_2O_3$ (alumina) formed on the insulation layer 32g, in such a way as to pass through in one turn at least between the lower yoke layer 32e and the upper yoke layer 32a, and has a spiral structure with a back contact portion 32i as a center. The write coil layer 32c is formed of a conductive material such as Cu (copper). The write coil layer 32c is covered with a coil-insulation layer 32d that is formed of an insulation material such as a heat-cured photoresist and electrically isolates the write coil layer 32c from the upper yoke layer 32a. The write coil layer 32c has a monolayer structure in this embodiment, however, may have a two or more layered structure or a helical coil shape. Further, the number of turns of the write coil layer 343 is not limited to that shown in FIG. 4, and may be, for example, in the range from two to seven.

The back contact portion 32i has a though-hole extending in X-axis direction, and the waveguide 36 and insulation layers that covers the waveguide 36 pass through this though-hole. In the though-hole, the waveguide 36 is away at a predetermined distance of, for example, at least 1 µm from the inner wall of the back contact portion 32i. The distance prevents the absorption of the waveguide beam by the back contact portion 32i.

The lower yoke layer 32e is formed on an insulation layer 44 made of an insulation material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 32e is formed of a soft-magnetic material, and its thickness is, for example, approximately 0.5 to 5 µm. Further, the lower shield 32f is a part of the magnetic path, being connected with the lower yoke layer 32e and reaching the head end face 38a. The lower shield 32f is opposed to the main magnetic pole 32b through the surface plasmon antenna 37, and acts for receiving the magnetic flux spreading from the main magnetic pole 32b. The lower shield 32f has a width in the track width direction greatly larger than that of the main magnetic pole 32b. This lower shield 32f causes the magnetic field gradient between the end portion of the lower shield 32f and the first main pole portion $32b_1$ to become steeper. As a result, jitter of signal output becomes smaller, and therefore, error rates during read operations can be reduced. The lower shield 32f is preferably formed of a material with high saturation magnetic flux density such as NiFe or an iron alloy as the main magnetic pole 32b is formed of.

Further, an inter-element shield layer 46 is desirably provided between the MR read head element 31 and the lower yoke layer 32e of the inductive write head element 32, sandwiched by the insulation layers 44 and 45. The inter-element shield layer 46 plays a role for shielding the MR read head element 31 from the magnetic field generated from the inductive write head element 32, and may be formed of a soft-magnetic material.

The laser diode 17 is bonded on the overcoat layer 38 so that the center section of its light-emitting surface 17a opposes a concave cavity 47 formed in a surface 38a of the overcoat layer 38. In this embodiment, the laser diode 17 is a photonic-crystal type surface-emitting laser diode, and has a multi-layered structure including an n-electrode 17b as an upper surface, a p-electrode 17k provided on the light-emitting surface 17a, an n-clad layer 17c, a p-clad layer 17i, an active layer 17e for generating a light, provided between the n-clad layer 17c and the p-clad layer 17i, and a photonic-band layer 17g having a periodic structure in which the generated light resonates, provided between the active layer 17e and the p-clad layer 17i.

The photonic-band layer 17g has a periodic structure in which, in a medium $17g_1$ having the first refractive index $n_{F1}$, a plurality of optical elements $17g_2$ having the second refractive index $n_{F2}$ different from the first refractive index $n_{F1}$ are arranged two-dimensionally and periodically. When a predetermined voltage is applied to between the n-electrode 17b and the p-electrode 17k, a light is generated by the recombination of an electron and a positive hole in the active layer. In the generated lights, a light having a wavelength comparable with (nearly equal to) the period of the periodic structure of the photonic-band layer 17g resonates within the layer 17g. Thus, only the light with wavelength and phase specified by the resonance proceeds in the direction perpendicular to a (two-dimensional periodic) plane $17g_3$ in which the two-dimensional period of the photonic-band layer 17g lies (in the thickness direction: in Z-axis direction). As a result, a laser beam 48 of a single-mode, having a predetermined beam cross-section area and an extremely small divergence angle (an almost-collimated beam) is emitted from the light-emitting surface 17a through the cavity 47 toward the first diffraction lens 33 in −Z direction.

Figure 5:
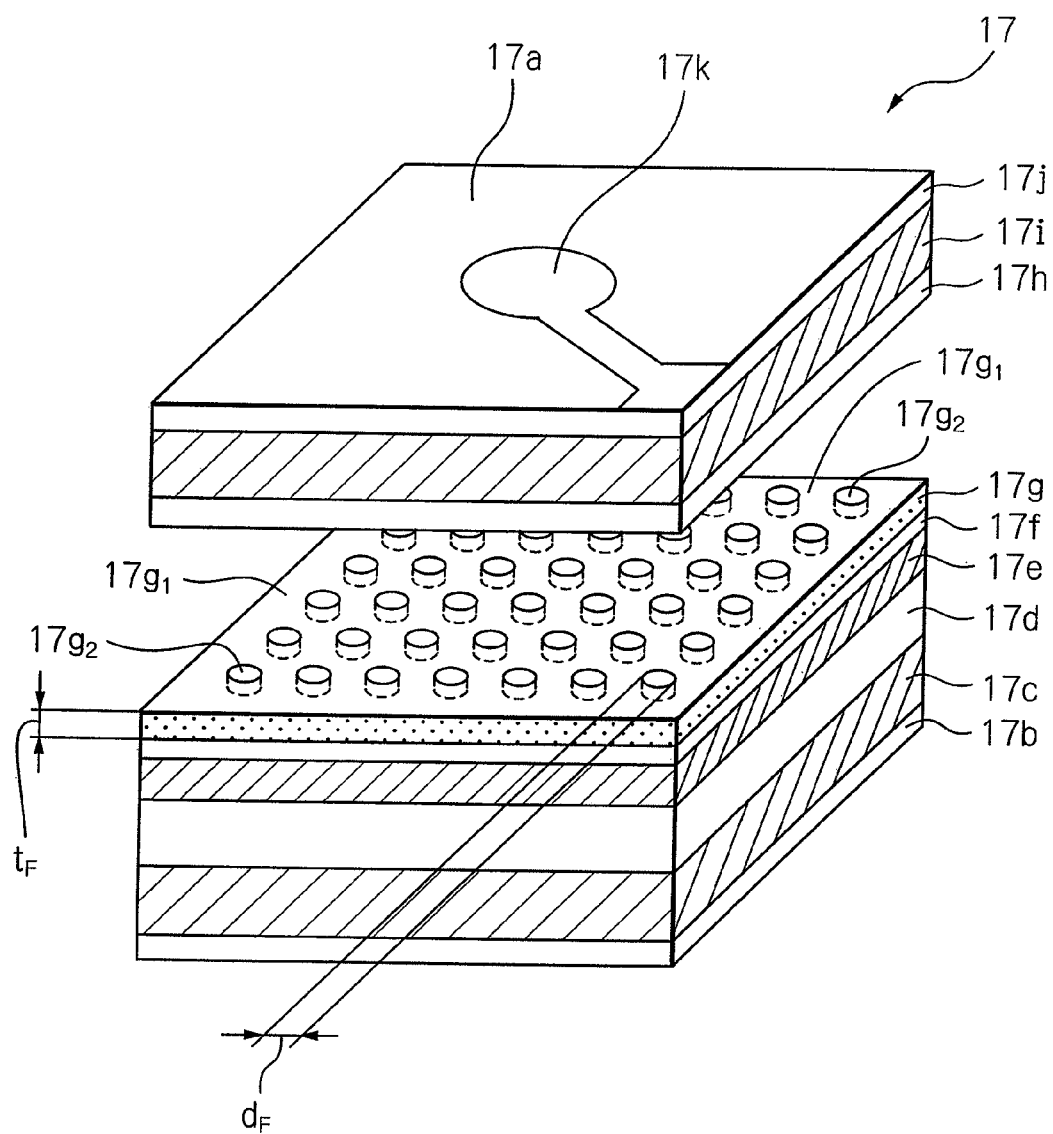
FIG. 5 is a perspective view illustrating the structure of a laser diode in the embodiment of FIG. 1.

FIG. 5 illustrates the structure of the laser diode 17. In the figure, for easy viewability of the periodic structure of the photonic-band layer 17g, the layer 17g and a spacer layer 17h are separated from each other. Further, for easy viewability of the p-electrode 17k, the light-emitting surface 17a, which corresponds to a bottom surface, is indicated as the upper side in FIG. 5.

As mentioned above, the laser diode 17 is a photonic-crystal type surface-emitting laser diode including a n-clad layer (substrate) 17c made of, for example, n-type AlGaAs, a p-clad layer 17i made of, for example, p-type AlGaAs, an active layer 17e having a multi-layered structure of multi-quantum well made of, for example, InGaAs layers and GaAs layers, and provided between the n-clad layer 17c and the p-clad layer 17i, and a photonic-band layer 17g provided between the active layer 17e and the p-clad layer 17i. Further, an n-electrode 17b is provided on the opposite side to the active layer 17e with respect to the n-clad layer 17c. A p-electrode 17k is provided on the opposite side to the active layer 17e with respect to the p-clad layer 17i, through a contact layer 17j made of, for example, p-type GaAs. Further, a spacer layer 17d made of, for example, n-type GaAs is provided between the n-clad layer 17c and the active layer 17e, and a spacer layer 17f made of, for example, p-type GaAs is provided between the active layer 17e and the photonic-band layer 17g. Furthermore, a spacer layer 17h made of, for example, p-type GaAs is provided between the photonic-band layer 17g and the p-clad layer 17i.

The photonic-band layer 17g has a periodic structure in which, in a medium $17g_1$ having the first refractive index $n_{F1}$, a plurality of optical elements $17g_2$ having the second refractive index $n_{F2}$ different from the first refractive index $n_{F1}$ are arranged two-dimensionally and periodically. The medium $17g_1$ can be formed of, for example, a semiconductor material such as p-type GaAs. And the optical elements $17g_2$ can be vacancy openings ($n_{F2} > n_{F1}$) passing through the layer 17g, which are provided in the medium $17g_1$. Alternatively, the optical elements $17g_2$ can be a part formed of a material that has the second refractive index $n_{F2}$ different from the first refractive index $n_{F1}$, the part being formed of an insulation material such as $Al_2O_3$ (alumina) or $SiO_2$ (silicon oxide), or a semiconductor material.

The optical elements $17g_2$ of the photonic-band layer 17g has a cross-section with circular shape. However, these optical elements $17g_2$ may have a cross-section with a shape of ellipsoid, a polygon such as triangle, or with one of other various shapes. Further, a plurality of optical elements $17g_2$ are arranged periodically within the layer 17g, and form a two-dimensional diffraction grating having square lattice the repeating unit of which is a square. The two-dimensional diffraction grating may be a lattice the repeating unit of which is, for example, another quadrangle such as a rhombus, a triangle, a hexagon or the like. By adjusting the refractive index $n_{F2}$, the cross-sectional shape, and the arrangement of these optical elements $17g_2$, there can be set and controlled the wavelength, the mode, the polarization and so on of the resonated laser beam considerably freely.

In the above-described laser diode 17 formed of GaAs-type material, the thickness $t_F$ of the photonic-band layer 17g is, for example, in the range of approximately 0.1 to 0.5 µm, and the diameter $d_F$ of the cross-section of each optical element $17g_2$ is, for example, in the range of approximately 0.05 to 0.2 µm. Further, the wavelength $\lambda_L$ of the laser beam emitted from the laser diode 17 is determined by the period of the two-dimensional diffraction grating that the optical elements $17g_2$ form. The period is, for example, in the range of approximately 0.1 to 0.4 µm. Alternatively, as the laser diode 17, InP base, GaAs base or GaN base diodes can be utilized, and the wavelength $\lambda_L$ may be, for example, in the range of 375 nm to 1.7 µm. Therefore, the period of the two-dimensional diffraction grating of the optical elements $17g_2$ is adjusted to an appropriate value within usable wavelength-range. Further, alternatively, the photonic-band layer may be disposed between the n-clad layer 17c and the active layer 17e, instead of between the active layer 17e and the p-clad layer 17i. Furthermore, an additional photonic-band layer can be provided between the n-clad layer 17c and the active layer 17e, together with the photonic-band layer 17g disposed between the active layer 17e and the p-clad layer 17i.

The two-dimensional diffraction grating within the photonic-band layer 17g has a property that, when lights propagate therein in at least two different directions with the same period respectively, these lights are overlapped. That is, a light that propagates from a lattice point of the two-dimensional diffraction grating along a direction returns to the original lattice point going through a plurality of diffractions. This property is derived from a dispersion relation (photonic-band) that is energy states of the light (photon), which senses the periodic refractive-index distribution of the two-dimensional diffraction grating. Here, the overlapped lights come into a resonant state. That is, the laser diode 17 does not include a light resonator (cavity) having reflecting plates opposed to each other as edge-emitting type diodes have, however, the very two-dimensional diffraction grating within the photonic-band layer 17g functions as a light resonator, that is, a wavelength selector.

Actually, by applying a predetermined voltage between the n-electrode 17b and the p-electrode 17k of the laser diode 17, a light is generated by the recombination of an electron and a positive hole in the active layer 17e. When the generated lights reach the photonic-band layer 17g, a light of the generated lights, having the same wavelength as the period of the two-dimensional diffraction grating of the photonic-band layer 17g, resonates within this photonic-band layer 17g, and its phase is specified. The light with the specified wavelength and phase propagates to the active layer 17e, and expedites the inductive emission in the active layer 17e. Then, the inductively-emitted light again propagates to the photonic-band layer 17g. Here, the wavelength and phase of the light satisfy the conditions for wavelength and phase in the two-dimensional diffraction grating of the photonic-band layer 17g. As a result, the light with a uniform wavelength and phase is amplified, and this phenomenon occurs in the region within the layers with the p-electrode 17k as a center. Therefore, the light with a uniform wavelength and phase propagates in the direction perpendicular to the active layer 17e and the photonic-band layer 17g, and finally, is emitted as a laser beam having a predetermined cross-section from the light-emitting surface 17a.

As is clear from the above-described principle, the laser diode 17 enables the emitted beam to have a larger spot size and further a higher degree of parallelization, that is, an extremely smaller divergence angle (for example, 1° or less), compared with a surface-emitting laser diode such as a VCSEL having no photonic-band layers. Further, the laser diode 17 can easily realize a laser beam with a single-mode, based on the above-described principle. The laser beam having a single-mode has a characteristic that, even when a spot size of the laser beam is decreased, a laser beam having a peak with a desired intensity can be obtained. Whereas, when a spot size of a laser beam with a multi-mode is decreased, the negation of intensities occurs, and thus the loss is increased. Moreover, the laser diode 17 also enables emitted beams with various types of polarizations by adjusting the arrangement of the optical elements $17g_2$.

Furthermore, the laser diode 17 can have a significantly high output. For example, in a VCSEL, the thickness of the active region corresponds to the cavity length, the thickness is at best in the range of, for example, approximately 2 to 10 µm. Therefore, the output of the VCSEL usually remains at several mW in CW (Continuous Wave) operation. On the other hand, the laser diode 17 of photonic-crystal surface-emitting type enables its output to be significantly enhanced by adequately enlarging the region of existence of the light that travels between the active layer 17e and the photonic-band layer 17g and has a uniform wavelength and phase (the spot region of the emitted light). In fact, an experiment result has been obtained, in which the output exceeded 1000 mW. The spot diameter of the spot region of the emitted light can be set to be, for example, in the range of 30 to 100 µm, in consideration of the incidence into the first diffraction lens 33.

Detailed explanations for laser diodes of photonic-crystal surface-emitting type are made in, for example, Kyosuke Sakai et al. "Lasing Band-Edge Identification for a Surface-Emitting Photonic Crystal Laser" IEEE JOURNAL ON SELECTED AREAS IN COMMUNICATIONS, Vol. 23, No. 7, p. 1335-1340 (2005), and U.S. Pat. No. 6,711,200 B1.

Figure 6:
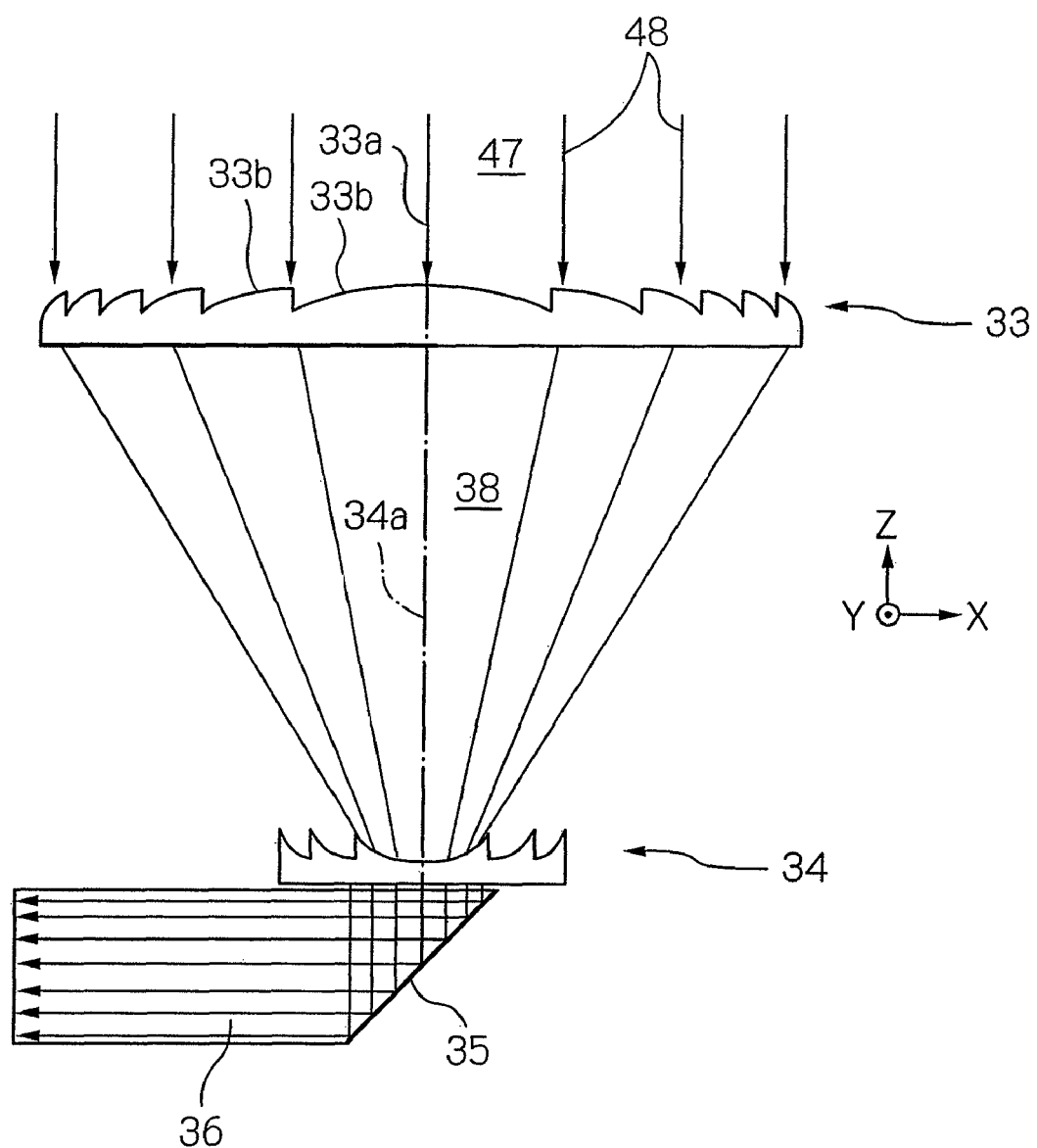
FIG. 6 is a view illustrating an optical system for leading a laser beam from the laser diode to a surface plasmon antenna in the embodiment of FIG. 1.

FIG. 6 illustrates an optical system for leading a laser beam from the laser diode 17 to the surface plasmon antenna in the embodiment of FIG. 1.

Hereinafter, configurations of this optical system will be described in detail with reference to FIGS. 6 and 4.

As mentioned above, the laser beam 48 emitted from the light-emitting surface 17a of the laser diode 17 is incident on the first diffraction lens 33 through the concave cavity 47 with which air is filled. This first diffraction lens 33 is a diffraction optical element having a convex lens function to make laser beam 48 that it is incident on converged. In this embodiment, the first diffraction lens 33 is configured by a Fresnel lens or a binary Fresnel lens that is formed by binarizing the Fresnel lens, to focus the laser beam 48 that has a spot diameter of approximately 50 µm and is parallel beam on the second diffraction lens 34 formed at a position spaced from the first diffraction lens 33 by an interval smaller than this spot diameter.

An optical axis 33a of the first diffraction lens 33 is set parallel to the Z-axis, and an incidence plane 33b of the lens, which is perpendicular to this optical axis 33a is installed in parallel with a surface (a two-dimensional periodic surface) $17g_3$ (FIG. 4) formed by the two-dimensional periodic structure of the photonic-band layer 17g of the laser diode 17. This first diffraction lens 33 is formed using thin-film fine processing technology on the top surface 38c of the protection layer 38 in the cavity 47. The optical axis alignment between the laser diode 17 and the first diffraction lens 33 is performed using the Z-axis as standard.

The first diffraction lens 33 with function of the convex lens may be a normal Fresnel lens having curved surfaces in the front surface as shown in FIG. 6, but may be a binary Fresnel lens formed by binarizing the Fresnel lens as shown in FIG. 4. The latter will be easy for fabrication of the optical system when using the thin-film processing technology. As is well-known, the Fresnel lens is formed by deleting materials of the thickness corresponding to the multiple of wavelength λ of the used laser beam from the convex lens with the normal curved surfaces, and exhibits optical performance as well as the normal convex lens in spite of being thinner structure. Furthermore, the binary Fresnel lens is formed with a discretely approximate section of the Fresnel lens. This section has a step structure of three layers each having a thickness of quarter wavelength λ/4 of the laser beam. In general, the number of the layers of the step structure will be (m−1) when a unit of thickness is determined as a length of the 2-m power of wavelength λ. If m increases, the number of the layers increases and the approximation improves so that it is possible to obtain optical performance nearer to that of the original convex lens. However, in this case, the fabrication process will become complex. It should be noted that m is an integer of 2 or more.

Figure 7:
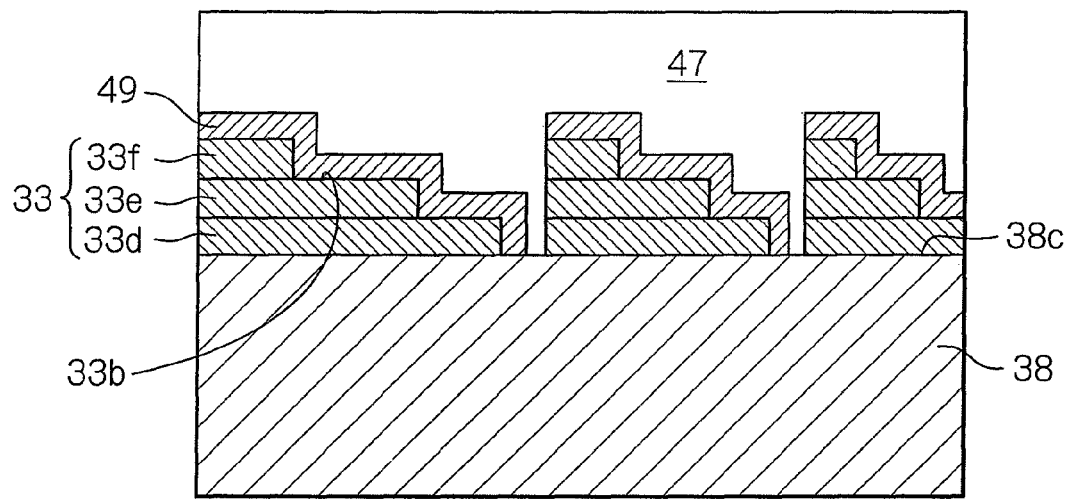
FIG. 7 is a sectional view schematically illustrating a part of a first diffraction lens formed by a binary Fresnel lens.

FIG. 7 schematically illustrates a part of the first diffraction lens 33 formed by a binary Fresnel lens.

As shown in the figure, the binary Fresnel lens 33 is made in a multi-layered pattern with a section corresponding to the Fresnel lens of FIG. 6, formed by appropriately laminating first, second and third annular diffraction grating layers 33d, 33e and 33f in parallel to the top surface 38c of the protection layer 38 in the cavity 47. The first, second and third diffraction grating layers 33d, 33e and 33f are made of materials having a refraction factor higher than that of the material of the insulation layer 38. For example, the first, second and third diffraction grating layers 33d, 33e and 33f may be made of tantalum oxide ($Ta_2O_5$, refraction factor $n_2$=2.15), niobium oxide ($Nb_2O_5$, refraction factor $n_2$=2.33) or titanium oxide ($TiO_2$, refraction factor $n_2$=2.3-2.55) when the insulation layer 38 is made of $Al_2O_3$ (refraction factor $n_3$=1.63). The thickness in the center region of this binary Fresnel lens 33 can be made smaller than the wavelength of the laser beam. Since the binary Fresnel lens 33 can be formed in a plane and thin shape using the thin-film fine processing technology, it is quite suitable for an optical component provided in the thermally-assisted magnetic recording head 15.

In this embodiment, because, as shown in FIG. 7, an incidence surface 33b of the first diffraction lens 33 contacts with air, an antireflective film 49 is coated over this incidence surface 33b. The antireflective film 49 is intended to reduce the intensity of the reflected beam using optical interference, so as to increase a transmission factor of this first diffraction lens 33.

Figure 8:
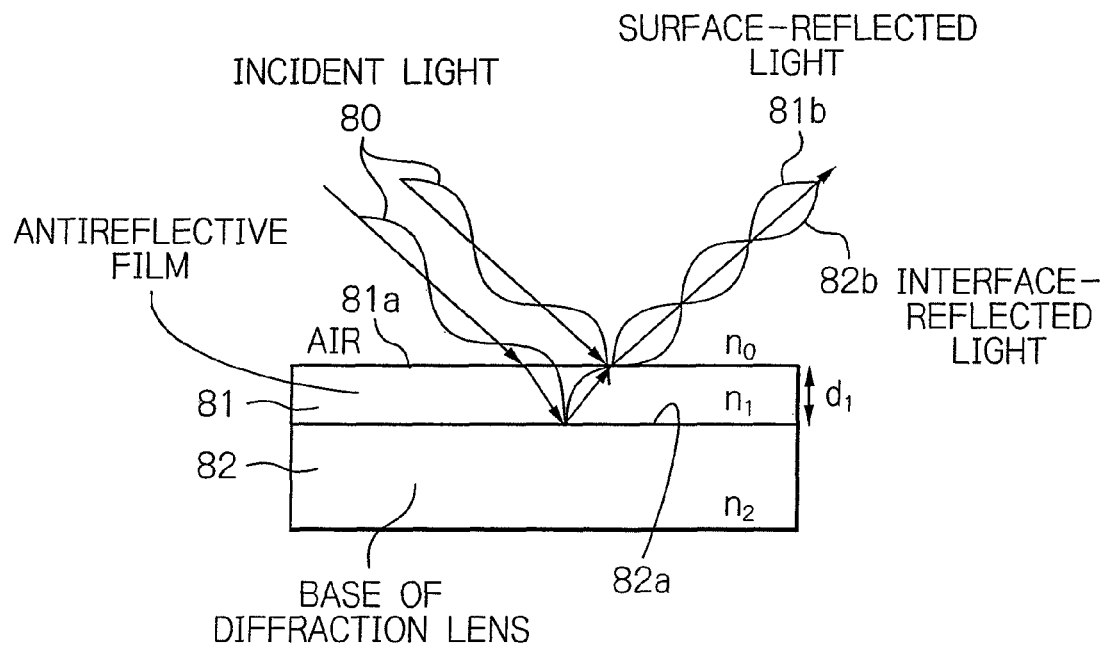
FIG. 8 is a view illustrating a principal of preventing reflection.

FIG. 8 illustrates a principal of the anti-reflection. As shown in the figure, an incident beam or light 80 is reflected at the surface 81a of the antireflective film 81 and at the interface 82a between this antireflective film 81 and the base 82 of the first diffraction lens to generate a surface-reflected beam or light 81b and an interface-reflected beam or light 82b, respectively. It is possible to reduce the reflected beam or light intensity by reversing and canceling the phase of the surface-reflected beam or light 81b and the phase of the interface-reflected beam or light 82b with each other. If the following formula is satisfied, the reflection factor will become zero, where λ (nm) is a wavelength of the incident beam or light 80, $n_1$ is a refraction factor of the antireflective film 81, $d_1$ (nm) is a thickness of the antireflective film 81 and $n_2$ is a refraction factor of the base 82. In this case, $n_0$ ($n_0$=1) is a refraction factor of the air.

$$n_1^2 = n_0 \times n_2$$

$$n_1 \times d_1 = \lambda/4$$

When $Ta_2O_5$ is used as a material of the base 82 of the first diffraction lens, the refraction factor $n_2$ of the base 82 becomes $n_2$=2.15, it is appropriate from the above formula that the refraction factor $n_1$ of the antireflective film 81 is $n_1$=1.47 (1.466288). Therefore, a resin or silicon oxide ($SiO_2$) with the refraction factor of 1.47 should be used as for the antireflective film 81.

In case of the first diffraction lens 33 shown in FIG. 7, if a photonic crystal laser for emitting a laser beam with a wavelength λ=930 nm is used, and if a multi-layered diffraction lens made of $Ta_2O_5$ each layer having a thickness of 233 nm is formed on the protection layer 38 made of $Al_2O_3$, and then an antireflective film 49 made of $SiO_2$ with a thickness of 159 (158.5637) nm is formed thereon by for example sputtering, a reflection factor at the incidence surface 33b of the first diffraction lens 33 will become approximately zero.

As shown in FIG. 6, the parallel beam 48 from the laser diode is focused by the first diffraction lens 33 on a position at which the second diffraction lens 34 is formed. The beam focused by the first diffraction lens 33 is collimated by the second diffraction lens 34, and the collimated beam is incident on the waveguide 36 integrally formed below the second diffraction lens 34, in a direction perpendicular to a propagation direction or an axial direction of the waveguide 36. In this embodiment, this second diffraction lens 34 is also formed from a Fresnel lens or a binary Fresnel lens formed by binarizing the Fresnel lens. An optical axis 34a of this second diffraction lens 34 is coaxial with an optical axis 33a of the first diffraction lens 33 and is in parallel to the Z-axis. The lens incidence surface 34b that is perpendicular to this optical axis 34a is set in parallel with the surface (two-dimensional period surface) $17g_3$ (FIG. 4) of the two-dimensional periodic structure of the photonic-band layer 17g of the laser diode 17. This second diffraction lens 34 is integrally formed using the thin-film processing technology on the waveguide 36 as will be described in detail later with reference to FIGS. 10a to 10d. The optical axis alignment of the laser diode 17, the first diffraction lens 33 and the second diffraction lens 34 is performed with reference to the Z-axis as a standard.

The second diffraction lens 34 with function of the concave lens may be a normal Fresnel lens having curved surfaces in the front surface as shown in FIG. 6, but may be a binary Fresnel lens formed by binarizing the Fresnel lens. The latter will be easy for fabrication of the optical system when using the thin-film processing technology. As is well-known, the Fresnel lens is formed by deleting materials of the thickness corresponding to the multiple of wavelength λ of the used laser beam from the concave lens with the normal curved surfaces, and exhibits optical performance as well as the normal concave lens in spite of being thinner structure. Furthermore, the binary Fresnel lens is formed with a discretely approximate section of the Fresnel lens. This section has a step structure of three layers each having a thickness of quarter wavelength λ/4 of the laser beam. In general, the number of the layers of the step structure will be (m−1) when a unit of thickness is determined as a length of the 2-m power of wavelength λ. If m increases, the number of the layers increases and the approximation improves so that it is possible to obtain optical performance nearer to that of the original convex lens. However, in this case, the fabrication process will become complex. It should be noted that m is an integer of 2 or more.

The insulation layer 38 is stacked on the second diffraction lens 34, and the waveguide 36 made of the same material as the lens 34 is integrally formed under the second diffraction lens 34. As well as the first diffraction lens 33, the second diffraction lens 34 of the binary Fresnel lens is made of materials having a refraction factor higher than that of the material of the insulation layer 38. For example, the second diffraction lens 34 may be made of $Ta_2O_5$ (refraction factor $n_2$=2.15), $Nb_2O_5$ (refraction factor $n_2$=2.33) or $TiO_2$ (refraction factor $n_2$=2.3-2.55) when the insulation layer 38 is made of $Al_2O_3$ (refraction factor $n_3$=1.63). The thickness in the center region of this binary Fresnel lens 34 can be made equal to or smaller than the wavelength of the laser beam. Since the binary Fresnel lens 34 can be formed in a plane and thin shape using the thin-film fine processing technology, it is quite suitable for an optical component provided in the thermally-assisted magnetic recording head 15.

Figure 9B:
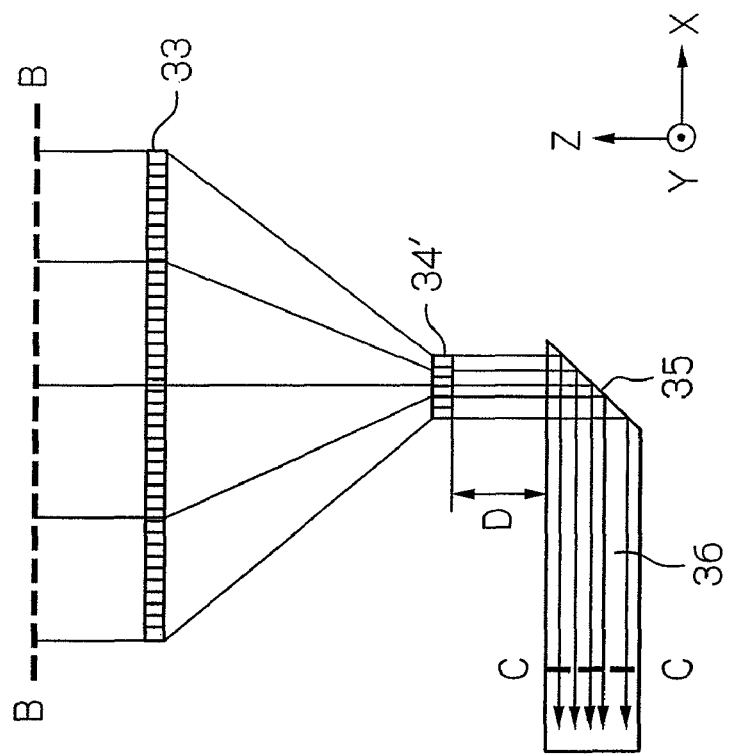
FIGS. 9a and 9b are views illustrating advantages of providing a second diffraction lens and advantages of integrating the second diffraction lens and a waveguide, in the embodiment of FIG. 1, respectively.
Figure 9A:
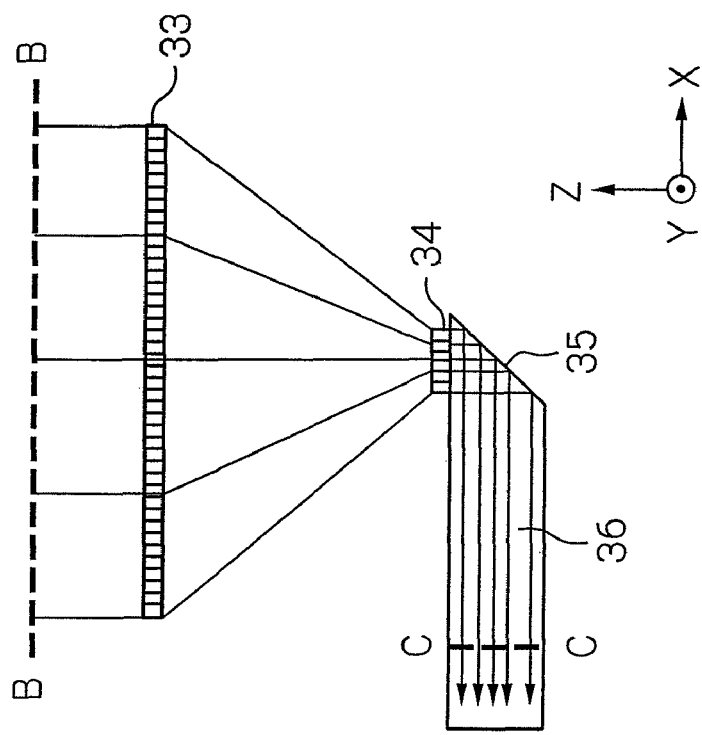

FIGS. 9a and 9b illustrate advantages of providing the second diffraction lens 34, and advantages of integrating the second diffraction lens 34 and the waveguide 36, as in this embodiment, respectively.

A power of beam emitted from the laser diode and applied to the first diffraction lens 33, measured at B-B section in these figures is assumed as Pi, and a power of the beam measured at C-C section on the way of the waveguide 36 is assumed as Po.

As shown in FIG. 9a, a measured value of Po/Pi when there is the second diffraction lens 34 was Po/Pi=43%, and the measured value of Po/Pi when there is no second diffraction lens 34 was Po/Pi=36%. That is, by providing the second diffraction lens 34 that collimates the focused beam, occurrence of multi-mode light due to aberration of the focused beam can be prevented and thus the laser beam from the laser diode can be extremely efficiently guided to the waveguide. In the above-mentioned measurement, the wavelength of the laser beam was $\lambda$=960 nm, the first diffraction lens 33, the second diffraction lens 34 and the waveguide 35 were made of $Ta_2O_5$, the protection layer 38 made of $Al_2O_3$ was inserted between the first diffraction lens 33 and the second diffraction lens 34, and a space between the first diffraction lens 33 and the second diffraction lens 34 was 35 µm.

In case that the second diffraction lens 34' and the waveguide 36 were not in contact with each other as shown in FIG. 9b and the distance D there between was D=10 µm, measured Po/Pi was Po/Pi=39%. Whereas the second diffraction lens 34 and the waveguide 36 were in contact with each other as shown in FIG. 9a and therefore the distance D there between was D=0 µm, measured Po/Pi was Po/Pi=43%. That is, if the second diffraction lens 34 for collimating the beam and the waveguide 36 are integrated and in contact with each other, a beam-utilization efficiency is remarkably improved. In the above-mentioned measurement, the wavelength of the laser beam was $\lambda$=850 nm, the first diffraction lens 33, the second diffraction lens 34' and the waveguide 35 were made of $Ta_2O_5$, the protection layers 38 made of $Al_2O_3$ were inserted between the first diffraction lens 33 and the second diffraction lens 34' and between the second diffraction lens 34' and the waveguide 36, and a space between the first diffraction lens 33 and the second diffraction lens 34' was 35 µm.

The reflection mirror 35 formed at one end of the waveguide 36 is an optical-path conversion element for converting a direction of the beam collimated by the second diffraction lens 34 into a propagation direction (an axial direction, -X direction) of the waveguide 36. Namely, this reflection mirror 35 converts the propagation direction of the collimated laser beam from -Z direction that is perpendicular to the element-formed surface 30b of the substrate 30 into the -X direction that is in parallel to the element-formed surface 30b and proceeding toward the end face 38a. This reflection mirror 35 can be formed by laminating a layer made of material with a high reflection factor and with sufficiently low transmission and absorption factors at the wavelength of the laser beam, namely made of metallic materials such as silver (Ag), gold (Au), aluminum (Al), tantalum (Ta) or NiFe for example, on the end face of the waveguide 36, sloping by 45 degrees with respect to the element-formed surface 30b. The front surface of this material layer becomes the reflection surface. Instead of the reflection mirror 35, a prism may be used as the optical-path conversion element.

As shown in FIG. 4, the waveguide 36 is a light path for receiving a laser beam that is incident through the second diffraction lens 34 and reflected by the reflection mirror 35, and for transmitting the received laser beam to the head end face 38a. This waveguide 36 extends from its rear end face 36b at which the reflection mirror 35 is formed to its front end face 36a at the side of the head end face 38a through a through-hole provided in a back contact section 32i along the X-axis direction. The surface plasmon antenna or near-field light generator 37 converts a laser beam (waveguide beam) transmitted through the waveguide 36 into near-field light. The waveguide 36 is formed integral with the second diffraction lens 34 by the same material as that of the second diffraction lens 34. That is, this waveguide 36 is made of $Ta_2O_5$ (refraction factor $n_2$=2.15), $Nb_2O_5$ (refraction factor $n_2$=2.33) or $TiO_2$ (refraction factor $n_2$=2.3-2.55).

FIGS. 10a to 10d illustrate an example of manufacturing process of the second diffraction lens 34, the reflection mirror 35 and the waveguide 36 in this embodiment. Because a common manufacturing method is applicable about the other manufacturing processes, explanation thereof is omitted.

Figure 10A:
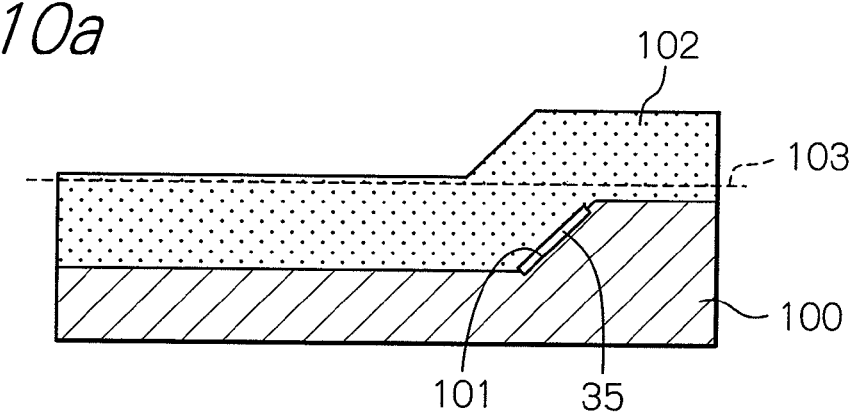
FIGS. 10a to 10d are views illustrating an example of manufacturing process of the second diffraction lens, the reflection mirror and the waveguide in the embodiment of FIG. 1.

As shown in FIG. 10a, a step 101 is formed on a protection layer 100 of $Al_2O_3$ and the reflection mirror 35 is formed on the step 101 by sputtering metallic materials such as Au, Al, Ta or NiFe. Then, a $Ta_2O_5$ layer 102 that becomes the second diffraction lens 34 and the waveguide 36 is laminated thereon.

Figure 10B:
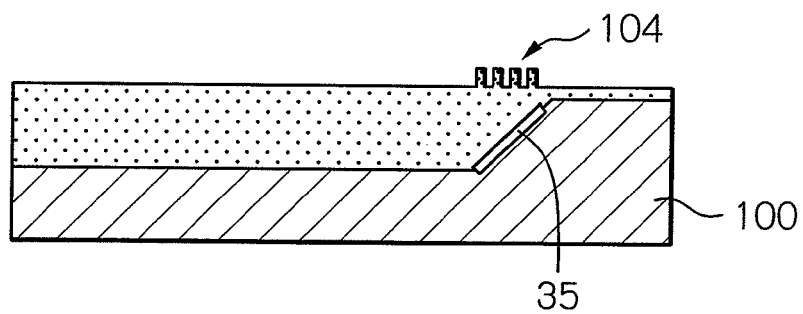

Then, the surface of the $Ta_2O_5$ layer 102 is polished and planarized to the broken line 103 of FIG. 10a, and as shown in FIG. 10b, a photosensitive resin is coated on the planarized surface, thereafter the coated resin is exposed using a light through a reticle and developed to form a resist pattern 104.

Figure 10C:
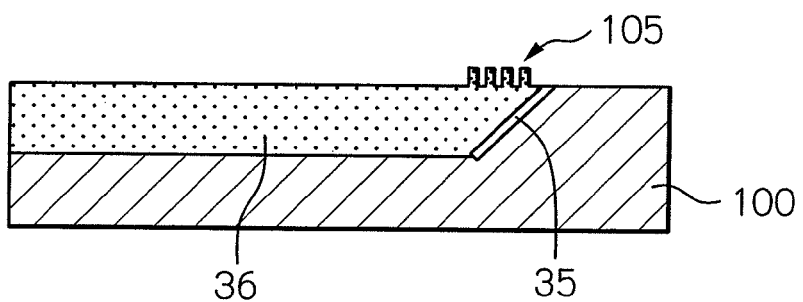

Then, as shown in FIG. 10c, by performing etching such as a reactive ion etching (RIE), a pattern of diffraction grating layer 105, which is one layer of the second diffraction lens 34, is formed on the surface of $Ta_2O_5$ layer 102.

Figure 10D:
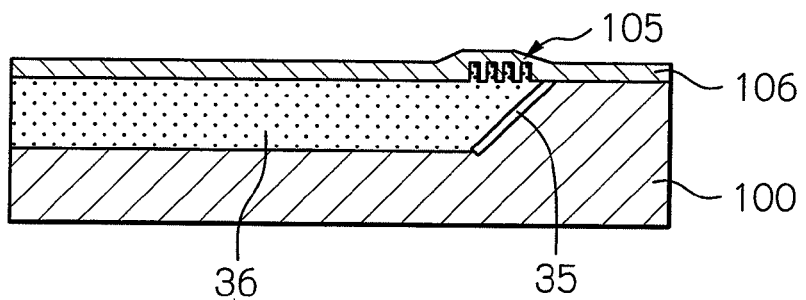

Then, as shown in FIG. 10d, a clad film 106 made of such as $Al_2O_3$ is deposited thereon and the surface of the deposited clad film 106 is polished and planarized.

Thereafter, diffraction grating layers of the second diffraction lens 34 are fabricated by repeating the production processes of FIGS. 10b to 10d.

The second diffraction lens 34 and the waveguide 36 are integrally formed by the same material by performing the above-mentioned process.

Hereinafter, configurations of the waveguide 36 and the surface plasmon antenna 37 in this embodiment will be described. As shown in FIG. 4, a part of the waveguide 36 at the side of the head end face 38a and the surface plasmon antenna 37 are formed between the lower shield 32f (lower yoke layer 32e) and the main pole 32b (upper yoke layer 32a). Also, a part of the top surface (the side face) of the waveguide 36 at the side of the head end face 38a and a part the lower face of the surface plasmon antenna 37 are opposed to each other with a predetermined space, and a portion sandwiched between these parts is a buffering portion 50 with a refraction factor lower than a refraction factor of the waveguide 36. This buffering portion 50 plays a role to couple a laser beam (waveguide beam) transmitted through the waveguide 36 to the surface plasmon antenna 37 in a surface plasmon mode. In modifications, this buffering portion 50 may be a part of an insulation layer 51 that is a part of the protection layer 38 or may be an additional layer provided separately from the insulation layer 51.

Figure 11:
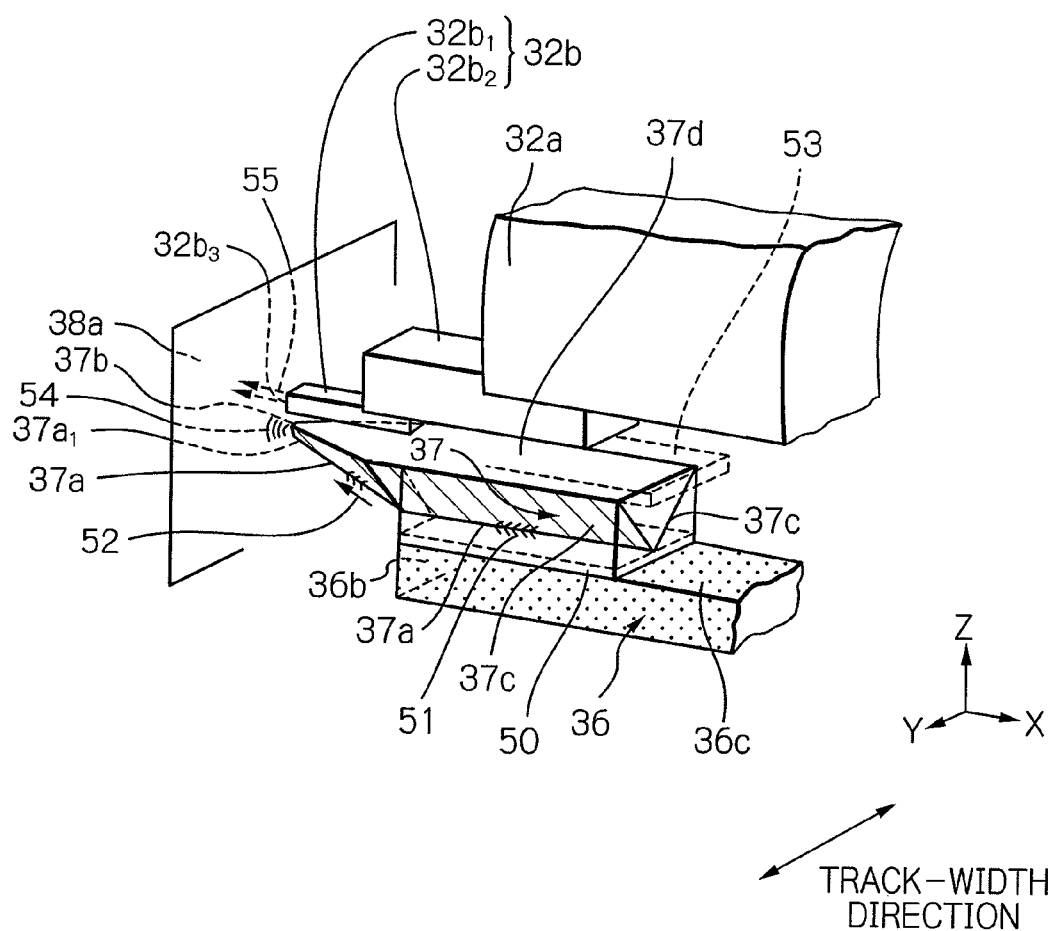
FIG. 11 is a perspective view schematically illustrating the structure of the waveguide, the surface plasmon antenna and a main pole in the embodiment of FIG. 1

FIG. 11 schematically illustrates the structure of the waveguide, the surface plasmon antenna and the main pole in this embodiment. Hereinafter, a near-field light generating optical system with the waveguide 36, the surface plasmon antenna 37 and the buffering portion 50 will be described in the details using this figure. In this figure, however, the write magnetic field and the head end face 38a including the position where a near-field light is emitted towards the magnetic recording medium are located in the left side.

As shown in the figure, the near-field light generating optical system is provided with the waveguide 36 for transmitting the laser beam used to generate a near-field light, and the surface plasmon antenna 37 having a propagation edge 37a that is the edge for propagating surface plasmon activated by the laser beam (waveguide beam). The waveguide 36 extends from its front face 36a to the end face 36b at the side of the head end face 38a, and the waveguide beam transmitted through the waveguide 36 reaches the part opposed to the surface plasmon antenna 37.

As aforementioned, the surface plasmon antenna 37 includes the propagation edge 37a and a near-field light generating end face 37b that reaches its end face at the side of the head end face 38a and is a destination for the propagating surface plasmon. The buffering portion 50 is a portion sandwiched between a part of the side surface of the waveguide 36 and a part of the lower face 37c including the propagation edge 37a of the surface plasmon antenna 37. That is, the propagation edge 37a is covered with the buffering portion 50. As aforementioned, the buffering portion 50 plays a role for coupling the waveguide beam with the surface plasmon antenna 37 in the surface plasmon mode. Further, the propagation edge 37a plays a role for propagating the surface plasmon excited by the waveguide beam to the near-field light generating end face 37b. Here, the side surfaces of the waveguide 36 are defined as end faces surrounding the waveguide 36, other than a sloped end face 36b at the side of the head end face 38a side and the rear end face 36a opposed thereto. These side surfaces serve as surfaces on which the propagating waveguide beam can be totally reflected in the waveguide 36 that corresponds to a core. In this embodiment, the side surface 36c of the waveguide 36, a portion of which is in surface contact with the buffering potion 50, is the upper surface of the waveguide 36.

Specifically, the waveguide beam, which has advanced to near the buffering portion 50, couples to the optical configuration including the waveguide 36 with a refraction factor $n_{WG}$, the buffering portion 50 with a refraction factor $n_{BF}$ and the surface plasmon antenna 37 made of a metallic material, and induces a surface plasmon mode on the propagation edge 37a of the surface plasmon antenna 37. That is, the waveguide beam couples to the surface plasmon antenna 37 in a surface plasmon mode. The induction of the surface plasmon mode becomes possible by setting the refraction factor $n_{BF}$ of the buffering portion 50 to be smaller than the refraction factor $n_{WG}$ of the waveguide 36 ($n_{BF} < n_{WG}$). Actually, evanescent light is excited within the buffering portion 50 under an optical boundary condition between the waveguide 36 as a core and the buffering portion 50. Then, the evanescent light couples to the fluctuation of electric charge excited on the metal surface (propagation edge 37a) of the surface plasmon antenna 37, and induces the surface plasmon mode, thereby excited is surface plasmon 51. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 37a is located closest to the waveguide 36 on the inclined lower surface 37c of the surface plasmon antenna 37, and is just an edge where electric field tends to converge, thus surface plasmon 51 can easily be excited on the edge 37a.

In the head structure as shown in FIGS. 4 and 5, the laser beam emitted from the light-emitting surface 17a of the laser diode 17 preferably has a linear polarization in which the oscillation direction of electric field of the laser beam is X-axis direction. Further, the laser beam being incident to the waveguide 36 resultantly has a linear polarization in which the oscillation direction of electric field of the laser beam is X-axis direction, and the laser beam transmitted through the waveguide 36 has a linear polarization in which the oscillation direction of electric field of the laser beam is Z-axis direction, that is, perpendicular to the layer surface of the waveguide 36. Such polarization condition enables the waveguide beam propagating through the waveguide 36 to be coupled with the surface plasmon antenna 37 in a surface plasmon mode.

The near-field light generating end face 37b of the surface plasmon antenna 37 is located close to an end face $32b_3$ of the main pole 32b, which reaches the head end face 38a. The propagation edge 37a extends to the near-field light generating end face 37b. Further, in this embodiment, a portion of the propagation edge 37a at the side of the end face 37b has a shape of straight line or curved line extending so as to become closer to the end face 37d of the surface plasmon antenna 37 as going toward the near-field light generating end face 37b, the end face 37d being opposite to the propagation edge 37a. Surface plasmon 51 excited on the propagation edge 37a propagates on this propagation edge 37a along the direction shown by an arrow 52. The propagation of the surface plasmon 51 can occur under the condition that the propagation edge 37a of the surface plasmon antenna 37 is covered with a buffering portion 50 having a refraction factor $n_{BF}$ equal to or higher than the refraction facto $n_{IN}$ of a material layer 53 covering the end face 37d on the opposite side to the edge 37a. The propagation edge 37a can be formed rounded to prevent surface plasmon 51 from running off from the edge 37a, and thus to prevent the degradation of light use efficiency. The curvature radius of the rounded edge is preferably in the range of 6.25 to 20 nm. The preferable curvature radius enables near-field light 54 with an intensity of electric field sufficient for realizing a satisfactory thermally-assisted magnetic recording to be generated from the near-field light generating end face 37b.

In this embodiment, the surface plasmon antenna 37 tapers in the height direction (Z-axis direction) at the side of the head end face 38a toward the near-field light generating end face 37b. Further, the surface plasmon antenna 37 has, in this embodiment, a cross-section taken by YZ plane with a triangular shape, especially, has a predetermined triangular shape in the vicinity of the head end face 38a. As a result, in this embodiment, the near-field light generating end face 37b has a triangular shape in which one apex is the end of the propagation edge 37a. Thus, surface plasmon 51 propagating on the propagation edge 37a reaches the near-field light generating end face 37b having an apex $37a_1$ as a destination of the edge 37a. As a result, the surface plasmon 51, namely, electric field converges in the near-field light generating end face 37b. Therefore, near-field light 54 is emitted from the end face 37b toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 55 generated from the main pole 32b is applied to the portion to perform write operation. Thus, the thermally-assisted magnetic recording can be achieved.

Meanwhile, in a conventional case in which a plasmon antenna provided on the end face of a head is directly irradiated with laser beam propagating through the waveguide without using a surface plasmon antenna, most of the irradiated laser beam has been converted into thermal energy within the plasmon antenna. As a result, the plasmon antenna has been brought to a very high temperature, for example, 500° C. (degrees Celsius). On the contrary, in the thermally-assisted magnetic recording with the surface plasmon antenna 37 according to the present invention, a surface plasmon mode is utilized, and near-field light 54 is generated by propagating surface plasmon 51 toward the head end face 38a. This brings the temperature at the near-field light generating end face 37b to, for example, about 100° C. during the emission of near-field light, which is greatly reduced compared to the conventional. This reduction of temperature allows the protrusion of the near-field light generating end face 37b toward the magnetic disk 10 to be suppressed; thereby favorable thermally-assisted magnetic recording can be achieved.

Furthermore, the length $L_{BF}$ of the whole buffering portion 50, that is, the portion through which the waveguide 36 and the surface plasmon antenna 37 are coupled with each other in a surface plasmon mode, is preferably larger than the wavelength $\lambda_L$ of the laser beam. In this preferable case, the coupling portion has an area markedly larger than a so-called "focal region" in the case that, for example, laser beam is converged on a buffering portion and a surface plasmon antenna and coupled in a surface plasmon mode. Therefore, a configuration quite different from the system including such "focal region" can be realized in the present invention, thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

The waveguide 36 and the buffering portion 50 are provided on −Z-axis side (on the leading side), that is, on the opposite side to the main pole 32b in relation to the surface plasmon antenna 37. As a result, the propagation edge 37a is also positioned on the opposite side to the main pole 32b within the surface plasmon antenna 37. By applying such a configuration, even when a distance between the end face $32b_3$ generating write field of the main pole 32b and the end face 37b emitting near-field light is sufficiently small, preferably 100 nm or less, the waveguide 36 can be separated sufficiently apart from the main pole 32b. As a result, there can be avoided a situation in which a part of the waveguide beam is absorbed into the main pole 32b made of metal and the amount of light to be converted into near-field light is reduced.

The side surfaces of the waveguide 36, namely the upper surface 36c, the lower surface and both the side surfaces in the track width direction (Y-axis direction) have a surface contact with the protection layer 38 except a portion having a surface contact with the buffering portion 50. As aforementioned, the waveguide 36 is made of $Ta_2O_5$ (refraction factor $n_2$=2.15), $Nb_2O_5$ (refraction factor $n_2$=2.33) or $TiO_2$ (refraction factor $n_2$=2.3-2.55). The just-described material structure of the waveguide 36 enables the propagation loss of laser beam to be reduced due to the excellent optical characteristics of the constituent material. Further, the waveguide 36 acting as a core can provide the total reflection in all the side surfaces of the waveguide 36 due to the existence of the protection layer 38 acting as a clad. As a result, more amount of laser beam can reach the position of the buffering portion 50, which improves the propagation efficiency of the waveguide 36. In this embodiment, a portion of the propagation edge 37a which is not opposed to the waveguide 36 (buffering portion 50) may be covered with a constituent material of the protection layer 38 having a refraction factor $n_{OC}$.

The surface plasmon antenna 37 is preferably made of a conductive material of, for example, a metal such as Ag, Au, palladium (pd), platinum (Pt), rhodium (Rh), iridium (Ir), ruthenium (Ru), Cu or Al, or an alloy made of at least two of these elements, especially with Ag as a main component. Further, the surface plasmon antenna 37 can have a width in the track width direction (Y-axis direction) of the upper surface 37d, the width being sufficiently smaller than the wavelength of the laser beam, and being in the range of, for example, approximately 10 to 100 nm. And the surface plasmon antenna 37 can have a thickness (in Z-axis direction) sufficiently smaller than the wavelength of the laser beam, the thickness being in the range of, for example, approximately 10 to 100 nm. Further, the length (height) (in X-axis direction) can be set to be in the range of, for example, approximately 0.8 to 6.0 μm.

The buffering portion 50 is made of a dielectric material having a refraction factor $n_{BF}$ lower than the refraction factor $n_{WG}$ of the waveguide 36. For example, the buffering portion 50 is made of $SiO_2$ or $Al_2O_3$. In these cases, this buffering portion 50 can be formed as a part of the protection layer 38 that is a clad made of $SiO_2$ or $Al_2O_3$. Also, a length (the X-axis direction) of the buffering portion 50 inserted between the side surface 36c of the waveguide 36 and the propagation edge 37a is desirably, 0.5-5 μm and longer than the wavelength of the laser beam. This buffering portion 50 is markedly wide in comparison with so-called "focal region" when a laser beam is focused to the buffering portion 50 and the surface plasmon antenna 37 to couple in a surface plasmon mode, and thus coupling with the very stable surface plasmon mode is enabled. Also, a thickness (along the Z-axis direction) of the buffering portion 50 is desirably 10-200 nm. These length and thickness of the buffering portion 50 are important parameters to obtain appropriate excitation and propagation of the surface plasmon.

The main pole 32b includes a first main pole section $32b_1$ having an end face $32b_3$ reached the head end face 38a and a second main pole section $32b_2$ having an end face at the side of the head end face 38a. The end face of the second main pole section $32b_2$ is overlapped on a portion of the first main pole section $32b_1$, which portion is opposed to the head end face 38a. Also, an edge portion of the upper yoke layer 32a at the side of the head end face 38a is overlapped on a portion of the second main pole section $32b_2$, which portion is opposed to the head end face 38a. Thus, the upper yoke layer 32a and the main pole 32b are formed as they approach the head end face 38a to close the near-field light generating end face 37b of the surface plasmon antenna 37. As a result, it is possible not only to separate enough the upper yoke layer 32a and the main pole 32b from the waveguide 36 but also to close enough the end face $32b_3$ of the main pole 32b to the near-field light generating end face 37b.

In a modification of this embodiment, a plasmon antenna configured by a flat plates metallic piece may be used instead of the surface plasmon antenna 37. In this modification, a waveguide beam from the waveguide 36 will be irradiated to the plasmon antenna to generate near-field light. Another surface plasmon antenna or plasmon antenna in various forms may be used instead of the surface plasmon antenna 37. At all events, it is possible to surely couple the laser beam emitted from the laser diode 17 mounted on the element-formed surface 38b with the surface plasmon antenna or plasmon antenna. In another modification, a laser beam from the waveguide 36 can be directly irradiated to the magnetic recording layer of the magnetic disk without using a near-field light generator to heat the magnetic recording layer.

As aforementioned in detail, according to this embodiment, the parallel beam from the photonic-crystal type surface-emitting laser diode 17 is focused by the first diffraction lens 33, and the focused beam is collimated by the second diffraction lens 34. The collimated beam is incident on the waveguide 36 that is integrally formed with the second diffraction lens 34 and made of the same material as that of the second diffraction lens 34. The optical path of the incident beam of the waveguide 36 is converted by the reflection mirror 35 and the path-converted beam is transmitted to the surface plasmon antenna 37. The photonic-crystal type surface-emitting laser diode 17 emits a large spot-sized parallel beam with a spot diameter of 50 µm or more, but it is necessary to decrease the spot diameter so as to effectively apply the beam into the waveguide 36 with a very small diameter of around 0.5 µm. In this embodiment, because the second diffraction lens 34 for collimation is provided so that the focused beam focused by the first diffraction lens 33 is collimated by the second diffraction lens 34 and the collimated beam is incident on the waveguide 36, occurrence of multi-mode light due to aberration of the focused beam can be prevented and thus the laser beam from the photonic-crystal type surface-emitting laser diode 17 can be extremely efficiently guided to the waveguide 36. Furthermore, since the second diffraction lens 34 and the waveguide 36 are integrally formed with each other and made of the same material, an efficiency of beam utilization is extremely improved. As a result, the large powered laser beam from the photonic-crystal type surface-emitting laser diode 17 can be extremely efficiently led to the surface plasmon antenna 37 located at a desired position as a very micro spot beam.

Also, because the antireflective film 49 is formed on the incidence surface 33b of the first diffraction lens 33, which is opposed across a space to the photonic-crystal type surface-emitting laser diode 17, it is possible to reduce a reflected light intensity by optical interference and thus to increase largely transmission factor of the first diffraction lens 33. Furthermore, because each of the first diffraction lens 33 and the second diffraction lens 34 is formed by Fresnel lens or binary Fresnel lens, it is possible to fabricate these diffraction lenses thin resulting the efficiency of the head manufacturing process to improve.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thermally-assisted magnetic recording head comprising:
   a surface-emitting type light source for emitting substantially collimated beam;
   a first diffraction optical element with a convex lens function for focusing the substantially collimated beam emitted from said surface-emitting type light source;
   a second diffraction optical element with a concave lens function for collimating the light beam focused by said first diffraction optical element;
   a waveguide integrally formed with said second diffraction optical element and made of the same material as that of second diffraction optical element, the light beam collimated by said second diffraction optical element being incident to said waveguide;
   an optical-path direction conversion element for converting a direction of an optical path of the incident light beam to a propagation direction of said waveguide, said propagation direction being toward an opposed-to-medium surface; and
   a magnetic pole for generating write field from its end face on the opposed-to-medium surface side.

2. The thermally-assisted magnetic recording head as claimed in claim 1, wherein said surface-emitting type light source and said first diffraction optical element are faced to each other through an air space.

3. The thermally-assisted magnetic recording head as claimed in claim 2, wherein an antireflective film is coated on an incident surface of said first diffraction optical element.

4. The thermally-assisted magnetic recording head as claimed in claim 3, wherein said antireflective film comprises a film for reducing an intensity of a reflected light beam using optical interference.

5. The thermally-assisted magnetic recording head as claimed in claim 1, wherein said optical-path direction conversion element comprises a reflection mirror formed at an end surface of said waveguide, for reflecting the incident light beam in an axis direction of said waveguide.

6. The thermally-assisted magnetic recording head as claimed in claim 1, wherein at least one of said first diffraction optical element and said second diffraction optical element comprises a Fresnel lens or a binary Fresnel lens.

7. The thermally-assisted magnetic recording head as claimed in claim 1, wherein said surface-emitting type light source comprises a laser source formed on an element-formed surface of a substrate, and provided with a multi-layered structure including a photonic-band layer having a periodic structure in which a light generated from an active region resonates, and the laser source having a light-emitting surface that is a layer surface as an end face of the multi-layered structure and is opposed to said element-formed surface.

8. The thermally-assisted magnetic recording head as claimed in claim 7, wherein said photonic-band layer has a two-dimensional periodic surface with the periodic structure and a lens surface perpendicular to an optical axis of said first diffraction optical element, said two-dimensional periodic surface and said lens surface being parallel to said element-formed surface of said substrate.

9. The thermally-assisted magnetic recording head as claimed in claim 1, wherein said head further comprises a plasmon antenna for exciting a surface plasmon in response to the light beam propagated through said waveguide to generate a near-field light from an end face at a side of the opposed-to-medium surface, and wherein said plasmon antenna is opposed to an edge of said waveguide at the side of the opposed-to-medium surface with a predetermined space.

10. The thermally-assisted magnetic recording head as claimed in claim 9, wherein said plasmon antenna comprises an edge extending from a portion that is coupled with the light propagating through said waveguide in a surface plasmon mode to a near-field light generating end face that generates the near-field light, the edge propagating the surface plasmon excited by the light beam.

11. The thermally-assisted magnetic recording head as claimed in claim 1, wherein said surface-emitting type light source comprises a photonic-crystal type surface-emitting laser diode with an output power of at least 50 mW.

12. A head gimbal assembly including a thermally-assisted magnetic recording head and a suspension for supporting said thermally-assisted magnetic recording head, said thermally-assisted magnetic recording head comprising:
   a surface-emitting type light source for emitting substantially collimated beam;
   a first diffraction optical element with a convex lens function for focusing the substantially collimated beam emitted from said surface-emitting type light source;
   a second diffraction optical element with a concave lens function for collimating the light beam focused by said first diffraction optical element;
   a waveguide integrally formed with said second diffraction optical element and made of the same material as that of second diffraction optical element, the light beam collimated by said second diffraction optical element being incident to said waveguide;

an optical-path direction conversion element for converting a direction of an optical path of the incident light beam to a propagation direction of said waveguide, said propagation direction being toward an opposed-to-medium surface; and a magnetic pole for generating write field from its end face on the opposed-to-medium surface side.

13. A magnetic recording apparatus including at least one head gimbal assembly with a thermally-assisted magnetic recording head and a suspension for supporting said thermally-assisted magnetic recording head, at least one magnetic recording medium, and a recording control circuit for controlling write operations of the thermally-assisted magnetic recording head to the at least one magnetic recording medium, said thermally-assisted magnetic recording head comprising:

a surface-emitting type light source for emitting substantially collimated beam;

a first diffraction optical element with a convex lens function for focusing the substantially collimated beam emitted from said surface-emitting type light source;

a second diffraction optical element with a concave lens function for collimating the light beam focused by said first diffraction optical element;

a waveguide integrally formed with said second diffraction optical element and made of the same material as that of second diffraction optical element, the light beam collimated by said second diffraction optical element being incident to said waveguide;

an optical-path direction conversion element for converting a direction of an optical path of the incident light beam to a propagation direction of said waveguide, said propagation direction being toward an opposed-to-medium surface; and a magnetic pole for generating write field from its end face on the opposed-to-medium surface side.

* * * * *